US012561633B2

(12) United States Patent  
Clise

(10) Patent No.: US 12,561,633 B2  
(45) Date of Patent: Feb. 24, 2026

(54) UNMANNED AERIAL VEHICLE ITEM DELIVERY

(71) Applicant: Express Scripts Strategic Development, Inc., St. Louis, MO (US)

(72) Inventor: Timothy B. Clise, Howell, MI (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 29 days.

(21) Appl. No.: 18/380,528

(22) Filed: Oct. 16, 2023

(65) Prior Publication Data

US 2024/0037487 A1 Feb. 1, 2024

Related U.S. Application Data

(63) Continuation-in-part of application No. 16/729,757, filed on Dec. 30, 2019, now Pat. No. 11,790,313.

(51) Int. Cl.  
*G06Q 10/08* (2024.01)  
*G06Q 10/083* (2023.01)  
(52) U.S. Cl.  
CPC .................................. *G06Q 10/083* (2013.01)  
(58) Field of Classification Search  
None  
See application file for complete search history.

(56) References Cited

U.S. PATENT DOCUMENTS 8,600,903 B2 12/2013 Eller  
9,346,547 B2 5/2016 Patrick 9,384,668 B2 7/2016 Raptopoulos  
9,434,473 B2 9/2016 Peeters  
9,573,684 B2 2/2017 Kimchi  
(Continued)

FOREIGN PATENT DOCUMENTS

WO WO-2014152670 A2 * 9/2014 ............. G06Q 10/08  
WO 2017214669 A1 12/2017

OTHER PUBLICATIONS

Shakhatreh et al., Unmanned aerial vehicles (UAVs): A survey on civil applications and key research challenges, Apr. 22, 2019, IEEE Access, vol. 7, pp. 48572-48634 (Year: 2019).*

(Continued)

*Primary Examiner* — Christopher Gomez  
(74) *Attorney, Agent, or Firm* — Miller Johnson

(57) ABSTRACT

Methods and systems for medication delivery using unmanned aerial vehicles (UAVs) are provided. The methods and systems: determine a target destination for a regional payload consisting of one prescription drug item, by a server communicatively coupled to: (i) a distance UAV comprising a fixed-wing aircraft configured to travel point-to-point to a regional hub, and (ii) a plurality of local UAVs comprising rotary wing, multi-rotor aircrafts residing at the regional hub; transmit instructions to the distance UAV to fly to the regional hub with a distance payload including a plurality of regional payloads; transmit instructions to a local UAV, to: obtain the regional payload consisting of the one prescription drug item; transport the regional payload to the target destination; perform lateral movement and hover operations to access a delivery site of the target destination; and deliver the one prescription drug item by releasing the regional payload at the delivery site.

17 Claims, 15 Drawing Sheets

(56) References Cited

U.S. PATENT DOCUMENTS

|  |  |  |  |  |
|---|---|---|---|---|
| 9,659,502 | B1 | 5/2017 | Abebe | |
| 9,777,502 | B2 | 10/2017 | Curlander | |
| 9,873,408 | B2 | 1/2018 | Capizzo | |
| 9,957,046 | B2 | 5/2018 | Patrick | |
| 10,106,257 | B2 | 10/2018 | Patrick | |
| 10,118,699 | B2 | 11/2018 | Lesser | |
| 10,403,155 | B2 | 9/2019 | Kimchi | |
| 10,405,198 | B2 | 9/2019 | Carpenter | |
| 10,514,690 | B1 * | 12/2019 | Siegel | G05D 1/0027 |
| 10,515,555 | B2 | 12/2019 | High | |
| 10,580,311 | B2 | 3/2020 | Schmalzried | |
| 10,691,142 | B2 | 6/2020 | Blake | |
| 10,710,722 | B2 | 7/2020 | Burgess | |
| 10,720,068 | B2 | 7/2020 | Raptopoulos | |
| 10,894,601 | B2 | 1/2021 | Blake | |
| 11,231,706 | B1 * | 1/2022 | Curlander | G05D 1/0684 |
| 11,922,361 | B2 * | 3/2024 | Kawaguchi | G06Q 10/08 |
| 2007/0043469 | A1 | 2/2007 | Draper | |
| 2009/0012802 | A1 | 1/2009 | Pinney | |
| 2013/0000260 | A1 | 1/2013 | McErlean | |
| 2014/0262690 | A1 * | 9/2014 | Henderson | B60M 1/346 |
| | | | | 198/602 |
| 2016/0189101 | A1 * | 6/2016 | Kantor | G08G 5/55 |
| | | | | 705/338 |
| 2016/0196756 | A1 * | 7/2016 | Prakash | G08G 5/54 |
| | | | | 701/3 |
| 2017/0011333 | A1 | 1/2017 | Greiner | |
| 2017/0083856 | A1 * | 3/2017 | Song | G06Q 10/0832 |
| 2017/0147975 | A1 * | 5/2017 | Natarajan | B64U 10/13 |
| 2018/0155011 | A1 | 6/2018 | Greiner | |
| 2018/0175349 | A1 | 6/2018 | Hummer | |
| 2018/0215546 | A1 | 8/2018 | High | |
| 2018/0364740 | A1 | 12/2018 | Collins | |
| 2019/0012631 | A1 | 1/2019 | Chatani | |
| 2019/0112049 | A1 * | 4/2019 | Phan | B64U 10/16 |
| 2019/0180237 | A1 | 6/2019 | Mattingly | |
| 2019/0197643 | A1 * | 6/2019 | Cochran | G06Q 10/06315 |
| 2019/0197646 | A1 | 6/2019 | Prager | |
| 2019/0263396 | A1 | 8/2019 | Arnouse | |
| 2019/0299802 | A1 | 10/2019 | Neubecker | |
| 2019/0340569 | A1 * | 11/2019 | Prager | G06Q 10/0832 |
| 2020/0017237 | A1 | 1/2020 | Walker | |
| 2020/0062505 | A1 * | 2/2020 | Chirnomas | G06Q 20/10 |
| 2020/0175471 | A1 | 6/2020 | Tsuruta | |
| 2022/0292436 | A1 * | 9/2022 | Kawaguchi | G06Q 10/083 |

OTHER PUBLICATIONS

Murray, et al., The flying sidekick traveling salesman problem: Optimization of drone-assisted parcel delivery, Transportation Research Part C: Emerging Technologies, vol. 54, 2015, pp. 86-109. (Year: 2015).

* cited by examiner

Figure 5:
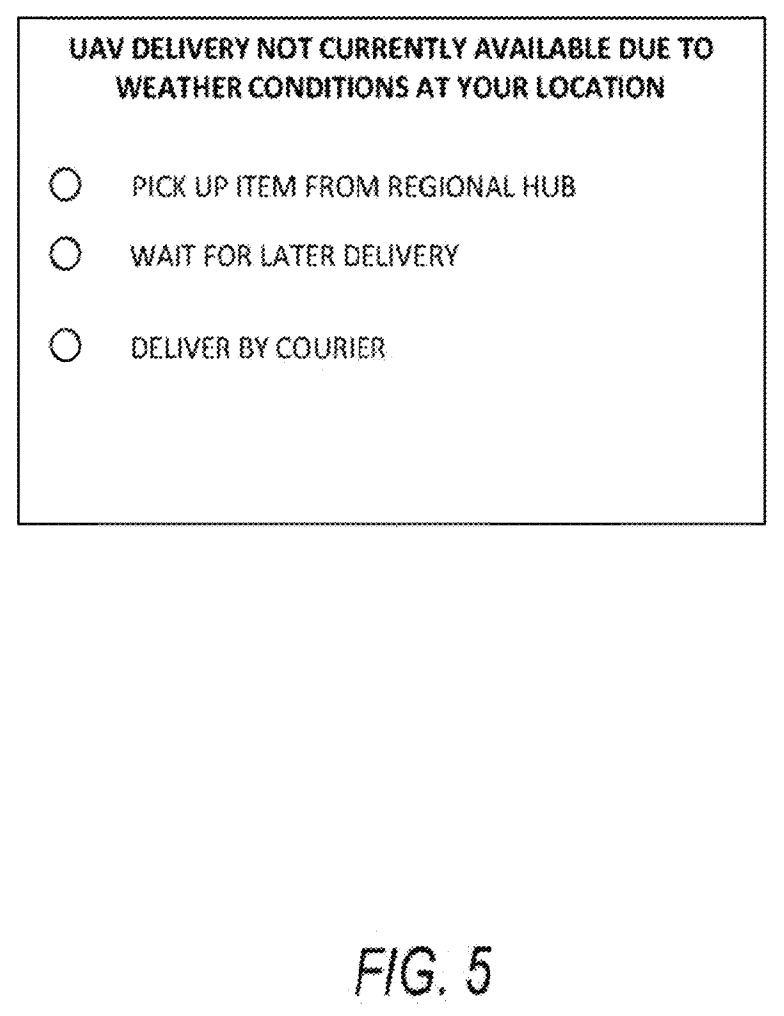

UAV DELIVERY NOT CURRENTLY AVAILABLE DUE TO
WEATHER CONDITIONS AT YOUR LOCATION

○   PICK UP ITEM FROM REGIONAL HUB

○   WAIT FOR LATER DELIVERY

○   DELIVER BY COURIER

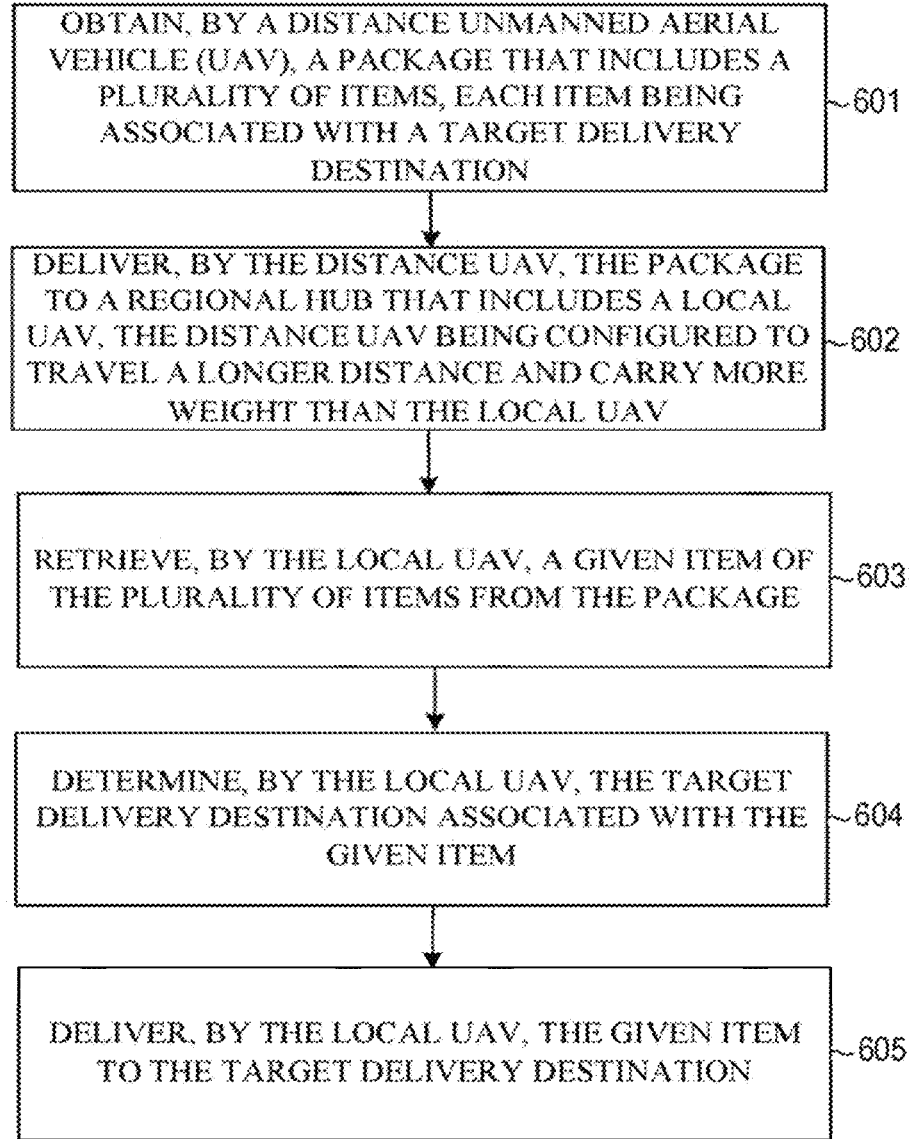

OBTAIN, BY A DISTANCE UNMANNED AERIAL VEHICLE (UAV), A PACKAGE THAT INCLUDES A PLURALITY OF ITEMS, EACH ITEM BEING ASSOCIATED WITH A TARGET DELIVERY DESTINATION ~601

DELIVER, BY THE DISTANCE UAV, THE PACKAGE TO A REGIONAL HUB THAT INCLUDES A LOCAL UAV, THE DISTANCE UAV BEING CONFIGURED TO TRAVEL A LONGER DISTANCE AND CARRY MORE WEIGHT THAN THE LOCAL UAV ~602

RETRIEVE, BY THE LOCAL UAV, A GIVEN ITEM OF THE PLURALITY OF ITEMS FROM THE PACKAGE ~603

DETERMINE, BY THE LOCAL UAV, THE TARGET DELIVERY DESTINATION ASSOCIATED WITH THE GIVEN ITEM ~604

DELIVER, BY THE LOCAL UAV, THE GIVEN ITEM TO THE TARGET DELIVERY DESTINATION ~605

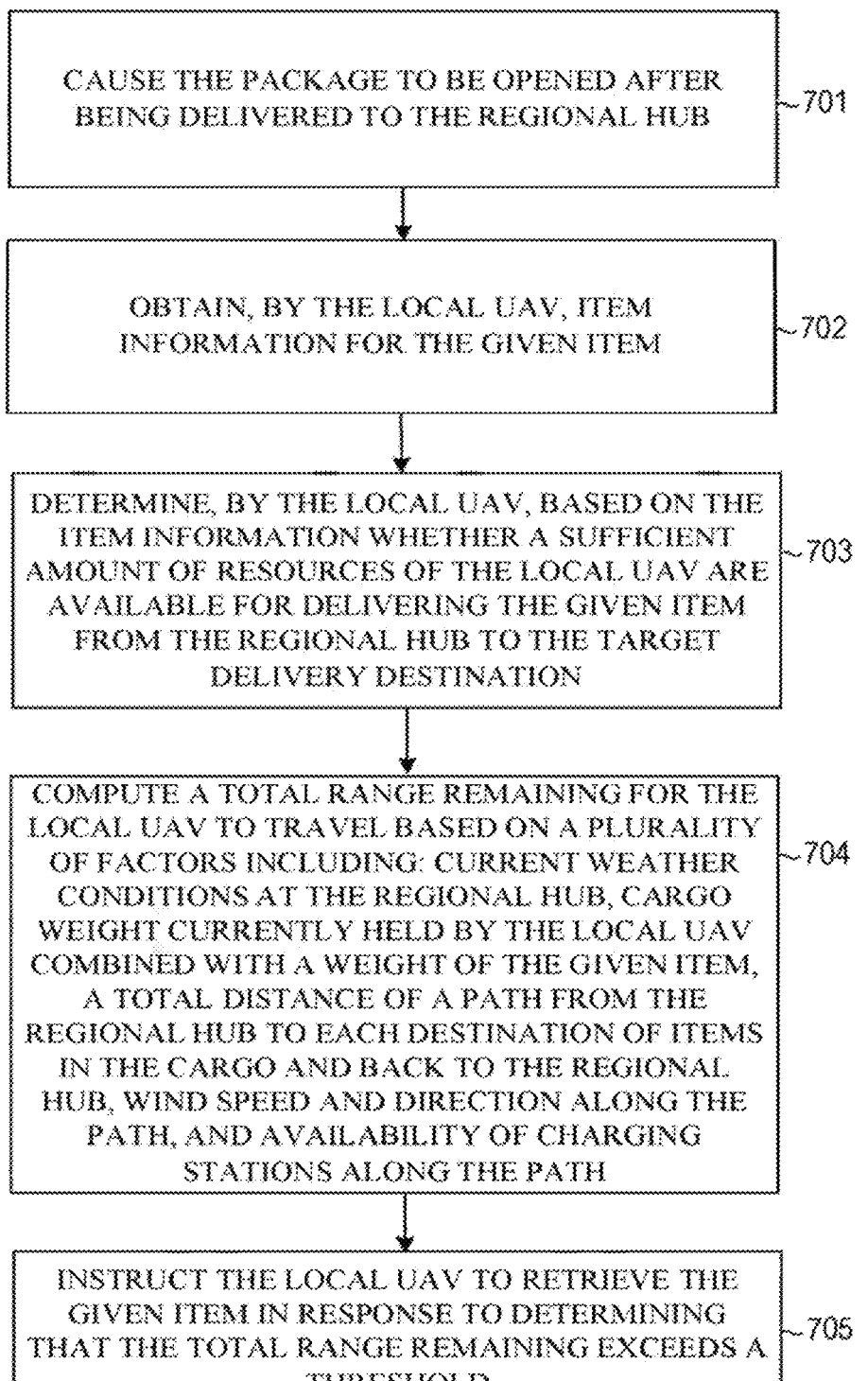

CAUSE THE PACKAGE TO BE OPENED AFTER BEING DELIVERED TO THE REGIONAL HUB ～701

OBTAIN, BY THE LOCAL UAV, ITEM INFORMATION FOR THE GIVEN ITEM ～702

DETERMINE, BY THE LOCAL UAV, BASED ON THE ITEM INFORMATION WHETHER A SUFFICIENT AMOUNT OF RESOURCES OF THE LOCAL UAV ARE AVAILABLE FOR DELIVERING THE GIVEN ITEM FROM THE REGIONAL HUB TO THE TARGET DELIVERY DESTINATION ～703

COMPUTE A TOTAL RANGE REMAINING FOR THE LOCAL UAV TO TRAVEL BASED ON A PLURALITY OF FACTORS INCLUDING: CURRENT WEATHER CONDITIONS AT THE REGIONAL HUB, CARGO WEIGHT CURRENTLY HELD BY THE LOCAL UAV COMBINED WITH A WEIGHT OF THE GIVEN ITEM, A TOTAL DISTANCE OF A PATH FROM THE REGIONAL HUB TO EACH DESTINATION OF ITEMS IN THE CARGO AND BACK TO THE REGIONAL HUB, WIND SPEED AND DIRECTION ALONG THE PATH, AND AVAILABILITY OF CHARGING STATIONS ALONG THE PATH ～704

INSTRUCT THE LOCAL UAV TO RETRIEVE THE GIVEN ITEM IN RESPONSE TO DETERMINING THAT THE TOTAL RANGE REMAINING EXCEEDS A THRESHOLD ～705

*FIG. 7*

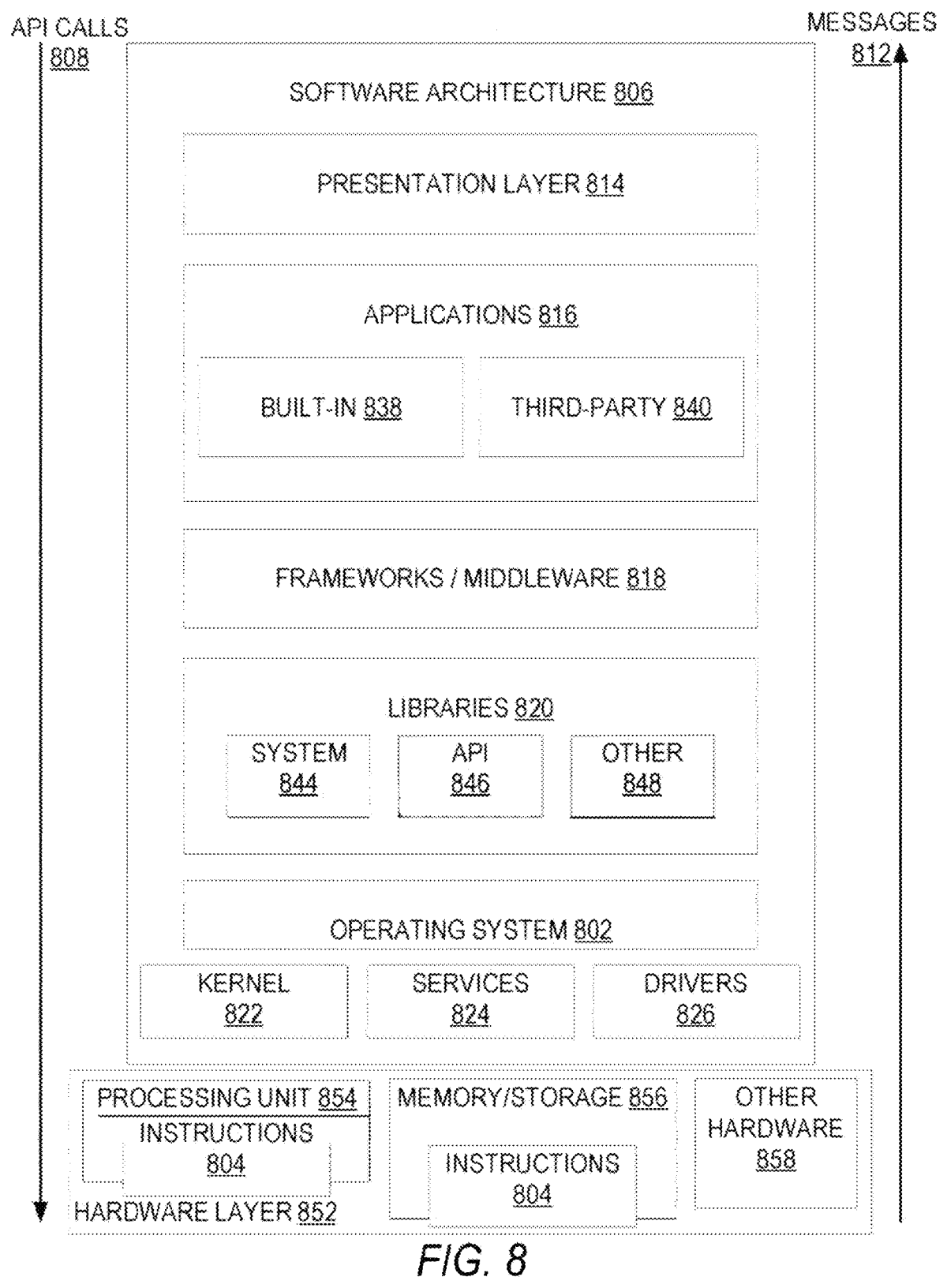

API CALLS
808

MESSAGES
812

SOFTWARE ARCHITECTURE 806

PRESENTATION LAYER 814

APPLICATIONS 816

BUILT-IN 838

THIRD-PARTY 840

FRAMEWORKS / MIDDLEWARE 818

LIBRARIES 820

SYSTEM
844

API
846

OTHER
848

OPERATING SYSTEM 802

KERNEL
822

SERVICES
824

DRIVERS
826

PROCESSING UNIT 854

INSTRUCTIONS
804

MEMORY/STORAGE 856

INSTRUCTIONS
804

OTHER
HARDWARE
858

HARDWARE LAYER 852

*FIG. 8*

Pallet Sizing And Pucking Device(s) — 1406

Loading Device(s) — 1408

Inspect Device(s) — 1410

Unit of Use Device(s) — 1412

Automated Dispensing Device(s) — 1414

Manual Fulfillment Device(s) — 1416

Review Devices — 1418

Imaging Device(s) — 1420

Cap Device(s) — 1422

Accumulation Devices — 1424

Packing Device(s) — 1426

Literature Device(s) — 1428

Unit of Use Packing Device(s) — 1430

1312

UNMANNED AERIAL VEHICLE ITEM DELIVERY

CROSS REFERENCED TO RELATED APPLICATIONS

This application is a continuation-in-part of U.S. patent application Ser. No. 16/729,757, filed Dec. 30, 2019.

This application references commonly-owned U.S. Pat. No. 8,600,903 issued to Charles Eller, filed Jun. 14, 2007, which is hereby incorporated by reference herein.

This application references commonly-owned Jacob J. Reinhardt U.S. patent application Ser. No. 14/630,373, filed Feb. 24, 2015, which is hereby incorporated herein by reference.

FIELD

The field relates to methods for transporting items, and specifically to transporting and delivering perishable items to remote locations using unmanned aerial vehicles (UAVs).

BACKGROUND

Mail order pharmacies provide a convenient and cost-effective option for patients to receive prescription drugs. For example, a mail order pharmacy may be capable of taking advantage of economies of scale, volume dispensing of prescription drugs, and centralized warehousing and shipping to reduce the cost of prescription drugs purchased by patients of the mail order pharmacy. Some types of prescription drugs may have temperature-related storage and handling requirements in order to maintain the safety and efficacy of the drugs. Such drugs may typically be shipped from a mail order pharmacy to the patient, doctor, nurse, treatment facility, or the like using insulated and/or temperature-controlled shipping containers.

BRIEF DESCRIPTION OF THE DRAWINGS

FIG. 5 is an illustrative input and output of the UAV server, according to some embodiments.

FIGS. 6 and 7 are flowcharts illustrating example operations of the UAV and/or UAV server, according to example embodiments.

FIG. 8 is a block diagram illustrating an example software architecture, which may be used in conjunction with various hardware architectures herein described.

DETAILED DESCRIPTION

Figure 1:
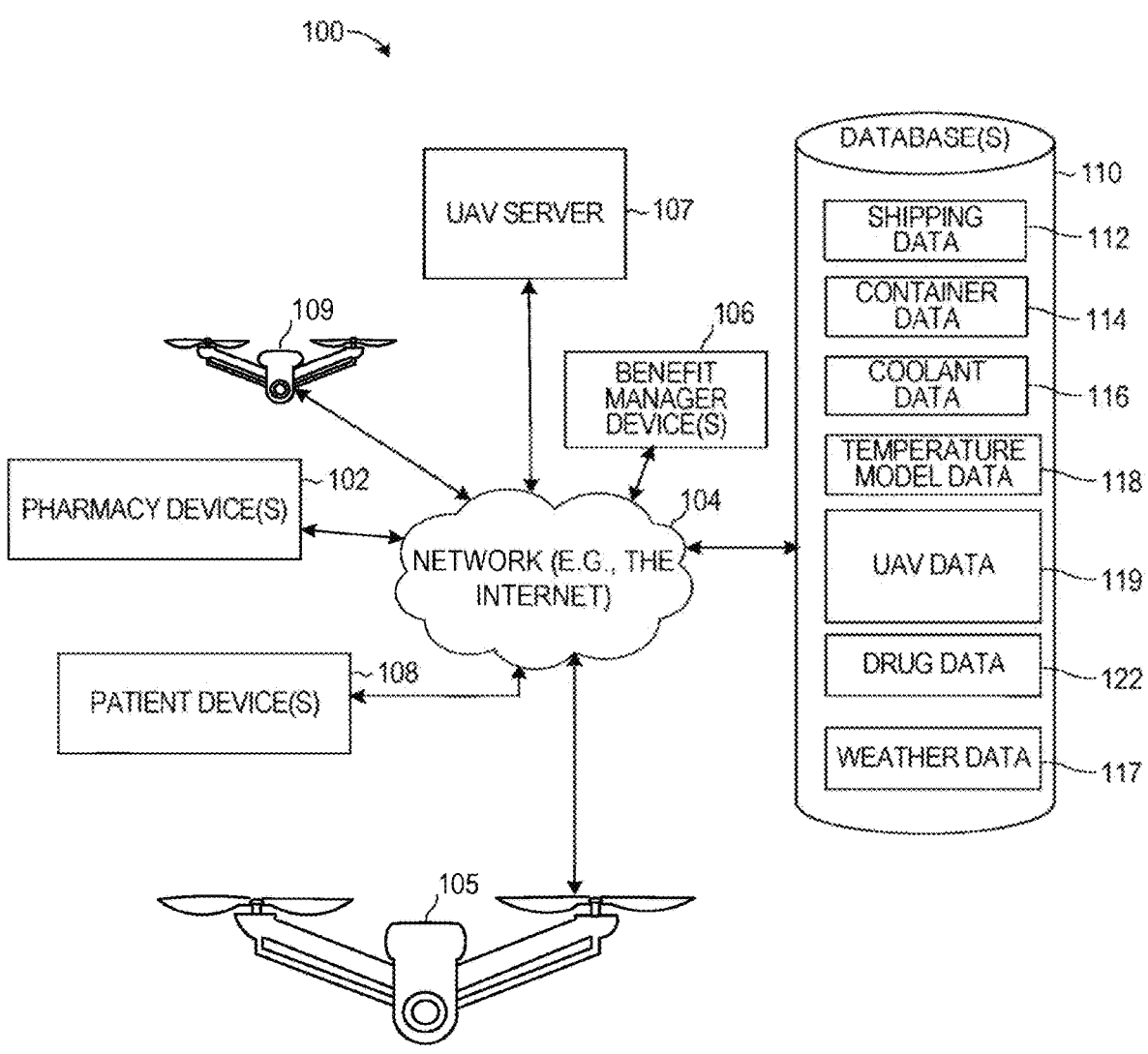
FIG. 1 is a block diagram of an example system, according to some embodiments.

Example methods and systems for perishable item transport and delivery using multiple types of UAVs are described. The perishable item can be a drug in an example embodiment. In the following description, for purposes of explanation, numerous specific details are set forth in order to provide a thorough understanding of example embodiments. It will be evident, however, to one of ordinary skill in the art that embodiments of the invention may be practiced without these specific details.

Transporting or transferring objects from one place to another involves considerations of combinations of factors that can be taken into account to ensure the proper and efficient transport of such objects. The factors and considerations, of course, vary depending on the object(s) desired to be transported. For example, physical properties and characteristics, such as weight, size, the physical constitution or make up, and the conditions under which an object should be transported, are some of the parameters that can be considered when one is deciding on the best method for shipping any particular object. Other factors that can be taken into consideration include the parameters of the container to be employed, such as the make up or constitution of the container to be used, the type and amount of cooling or heating, if any, that should be provided for a substance to be transportation, the distance that an object is to be transported, and the weather and environmental conditions that an object or container may be exposed to during its journey, including susceptibility to being altered in different weather conditions and climates. An object can include a package or container that stores a plurality of items for transportation. The items or a single item in the object may be subject to the factors described herein relative to its transportation from a source (e.g., a distance center, a pharmacy, a high volume pharmacy, or the like) to an intermediate, regional hub and then on to its end destination location.

For many temperature or environmentally sensitive perishable items, such as foods, drugs, body organs, and material samples, it is often desirable to maintain a specific constant temperature, or range of temperatures, during transportation or storage of such objects. In addition, the shipment of multiple temperature sensitive objects in one container, where each object is required to be maintained at a different temperature, is frequently required in the course of transport of objects for medical and scientific research or use. The quantity of material which can be shipped may sometimes be of such small size that delivery by express or courier service is feasible and cost effective, so long as each object can be maintained at its own temperature range. Refrigerating or self-heating containers generally provide relatively constant temperatures or temperature ranges for such products, but tend to be bulky, heavy, and complicated to operate.

In many cases, the manner in which such perishable items are transported to an end consumer and/or destination location depends on an expected amount of time the item will be left unattended at a delivery destination after being delivered to avoid spoilage. Namely, the packaging of the perishable items and the mode of transport are selected with the expectation that the item will be left unattended on a doorstep or porch for a maximum period of time (e.g., 2 hours, 4, hours, 8 hours, or less). Sometimes, packages with perishable items are delivered to remote locations which take a great deal of time. To account for the added delays in transporting such items to remote locations, additional packaging material is provided to avoid spoilage of the items for a longer period of time. Such additional packaging material can be very expensive and may not be environmentally friendly making the transport of such perishable items cost prohibitive. Such expenses are typically passed down to the end consumer which raises the overall cost of the perishable items.

The disclosed embodiments provide systems and methods to deliver items to remote locations using multiple unmanned aerial vehicles (UAVs). Specifically, the disclosed embodiments, obtain, by a distance unmanned UAV an object, e.g., a package that includes a plurality of items, each item being associated with a target delivery destination. The disclosed embodiments deliver, by the distance UAV, the package to a regional hub that includes one or more than one local UAVs, where the distance UAV is configured to travel a longer distance and carry more weight than the local UAV. The local UAV retrieves a given item of the plurality of items from the package and determines the target delivery destination associated with the given item. The local UAV delivers the given item to the target delivery destination. In this way, the delivery service can select delivery parameters for delivering perishable items that consume less overall resources (e.g., less expensive packaging and delivery modes) than conventional methods and can deliver such items to remote locations in a more environmentally friendly manner. This reduces the overall cost and system resources needed to accomplish a task of delivering perishable items to a consumer and improves the overall efficiencies of the devices, such as by reducing the amount of resources needed to package items for long expected porch times and reducing the number of transportation modes needed to deliver the items.

FIG. 1 is a block diagram of an example system 100, according to an example embodiment. The system 100 is an example embodiment in which the packaging and/or shipment of perishable items (e.g., temperature sensitive drugs) may be managed using various combinations of distance and local UAVs. The disclosed embodiments are discussed in relation to temperature sensitive drugs. Other embodiments include any other type of perishable item, such as groceries, food, body organs, flowers, and so forth. In the example of body organs, the item includes a temperature sensor that detects internal temperature of the enclosure containing the item. An enclosure containing a bodily organ can be given priority for delivery over other item types. In the example of flowers, the enclosure should not drop below the freezing point of water and may hold an internal vacuum or be pumped with an inert gas. The system 100 includes a pharmacy device 102 in communication with a benefit manager device 106 over a network 104. The system may also include a patient device 108, a UAV server 107, one or more distance UAVs 105, one or more local UAVs 109, and/or a database(s) 110.

The pharmacy device 102 may include hardware and/or software of a mail order pharmacy and/or or a retail pharmacy to enable the pharmacy to fulfill prescription drug orders. The pharmacy device 102 may be operated in an automated manner, as directed by an operator (e.g., a pharmacist or pharmacist technician), or otherwise. Examples of pharmacy operations that may be performed by pharmacy device 102 include filling a prescription after removing pharmaceuticals from inventory, labeling a container or other packaging with prescription information, filling the container or other packaging with the pharmaceutical, verifying the type and quantity of the pharmaceutical in the container with that which is printed on the label, and the like. In some embodiments, the pharmacy device 102 may be used to determine how to select and prepare a shipping container to deliver prescription drugs, e.g., via parcel delivery, mail delivery, and the like. The pharmacy device 102 may communicate the identification of prescriptions and the shipping container needed for the prescriptions to the UAV server 107.

In some embodiments, the pharmacy device 102 may be a device associated with a retail pharmacy location (e.g., an exclusive pharmacy location, a grocery store with a retail pharmacy, or a general sales store with a retail pharmacy) or other type of pharmacy location from which an individual (e.g., as a patient of a pharmacy and/or a member of a benefit plan) attempts to obtain a prescription. In some embodiments, the pharmacy device 102 may be utilized by the pharmacy to submit the claim to the pharmacy benefit manager (PBM) device 106 for adjudication (e.g., when the patient of the pharmacy is a member of a benefit plan offered by the PBM). Additionally, in some embodiments, the pharmacy device 102 may enable information exchange between the pharmacy and the PBM device 106, for example, to allow the sharing of member information such as drug history, and the like, that may allow the pharmacy to better service a member (e.g., by providing more informed therapy consultation and drug interaction information).

In some embodiments, the pharmacy device 102 may be associated with a mail order pharmacy. The mail order pharmacy may fill or refill the prescription, and may deliver the prescription drug to the member via a parcel service in accordance with an anticipated need, such as a time-wise schedule, or the like. In some embodiments, the mail order pharmacy may deliver the prescription drug to the member via a combination of the distance UAV 105 and the local UAV 109. Specifically, the mail order pharmacy may identify a target delivery destination to the UAV server 107 along with a prescription drug and packaging material or perishable attributes of the drug. The UAV server 107 may generate a delivery path for the drug from a distance hub through a regional hub to the target delivery destination. The UAV server 107 may determine delivery path parameters, such as weather conditions (e.g., temperature, wind direction, wind speed, and others) and estimated travel duration to select the proper packaging material (e.g., cooling material) in which the drug is placed. The UAV server 107 may instruct the distance UAV 105 to obtain the package with the drug from the distance hub and deliver the package over a first distance to a regional hub. A local UAV 109 at the regional hub may detect that the distance UAV 105 has arrived and that the package containing the drug has been opened. The local UAV 109 may identify the drug in the opened package and obtain the drug. The local UAV 109 may then deliver the drug from the regional hub to the target delivery destination over a second distance that is shorter than the first distance. As such, a person or patient who is physically outside the range of the distance hub where the drug is packaged but is in the range of the regional hub may receive the package from the local UAV 109 and may not need to visit the retail pharmacy store in person to have the prescription refilled and/or to pick up the refilled prescription. In addition to the convenience of receiving the refills of the prescription directly to the patient's home or other designated location of delivery, the cost of the prescription drugs purchased through a mail order delivery pharmacy may be less than the cost of the same prescription drugs purchased from a retail pharmacy. The lower costs available through the mail order pharmacy may be the result, for example, of economies of scale available to the mail order pharmacy, and increased shipping speed by use of UAVs, that may be at least partially passed along to the member as well as the savings realized by the client. The lower costs available through the mail order pharmacy may be the result of a lower co-pay required by the patent in the role of a member of a health care plan, under which the member may receive the prescription drugs.

Examples of the network 104 include Mobile Communications (GSM) network, a code division multiple access (CDMA) network, 3rd Generation Partnership Project (3GPP), 4th Generation Partnership Project (4GPP), an Internet Protocol (IP) network, a Wireless Application Protocol (WAP) network, a Wi-Fi network, or an IEEE 802.11 standards network, as well as various combinations thereof. The network 104 may include optical communications. The network 104 may be a local area network or a global communication network, such as the Internet. Other conventional and/or later developed wired and wireless networks may also be used. In some embodiments, the network 104 may include a prescribing network. The benefit manager device 106 is a device operated by an entity at least partially responsible for creation and/or management of the pharmacy or drug benefit. While the benefit manager operating the benefit manager device 106 is typically a pharmacy benefit manager (PBM), other entities may operate the benefit manager device 106 either on behalf of themselves, the PBM device 106, or another entity. In some embodiments, a PBM device 106 that provides the pharmacy benefit may also provide one or more than one additional benefits including a health benefit, a dental benefit, a vision benefit, a wellness benefit, a radiology benefit, a pet care benefit, an insurance benefit, a long term care benefit, a nursing home benefit, and the like.

Some of the operations of the PBM that operates the benefit manager device 106 may include the following. A member (or a person on behalf of the member) of a pharmacy benefit plan administered by or through the PBM device 106 attempts to obtain a prescription drug at a retail pharmacy location where the member can obtain drugs in a physical store from a pharmacist or pharmacist technician, or in some instances through mail order drug delivery from a mail order pharmacy location. The member may also order or obtain a prescription drug directly or indirectly through the use of a machine, such as a kiosk, vending unit, mobile electronic device, or a different type of mechanical, electrical, and/or computing device. These devices can communicate with the PBM device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of the client with the PBM device 106. The member's co-pay may be a flat co-pay (e.g., $10), co-insurance (e.g., 9%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug. In some embodiments, the amount of the co-pay may be flagged in the member record for reduction if the member chooses to receive the prescription drug by way of one or more types of UAVs (e.g., one or more types of drones or automated UAVs). For example, the member may be associated with location that is remote from the pharmacy where the drug is kept. Specifically, the member may be outside the range of a distance UAV 105 (e.g., a distance drone) that collects the drugs from the pharmacy at the distance hub. In such cases, the member may elect to receive the drugs by way of the local UAV 109 (e.g., a local drone) which is in a regional hub that can reach the member's location. If the member allows the UAV server 107 to coordinate delivery of the drug by having the distance UAV 105 deliver the drug from the distance hub to the regional hub and then having the local UAV collect the drug from the regional hub and deliver the drug to the member's location, the member's record may be flagged to receive a discount on the co-pay or other member benefit. The use of UAVs to deliver drugs can improve adherence to a drug regimen as the presently described systems and methods can deliver drugs on time to a remote patient location or a remote healthcare facility.

In some embodiments, the UAV server 107 and the pharmacy device 102 and/or benefit manager device 106 are operated by a single entity. In other embodiments, the UAV server 107 and the pharmacy device 102 and/or benefit manager device 106 are operated by different entities. In some embodiments, the UAV server 107 and the pharmacy device 102 and/or benefit manager device 106 are jointly operated (e.g., on a single device or on a pool of devices), while in other embodiments, the UAV server 107 and the pharmacy device 102 and/or benefit manager device 106 are operated separately.

In conjunction with receiving the co-pay (if any) from the member and dispensing the prescription drug to the member, the pharmacy submits a claim to the PBM device 106 for the prescription drug. The PBM device 106 may perform certain adjudication operations including verifying the eligibility of the member, reviewing the formulary of the member to determine appropriate co-pay, coinsurance, and deductible for the prescription drug, and performing a drug utilization review (DUR) on the member. The PBM device 106 then provides a response to the pharmacy device following performance of the aforementioned operations. As part of the adjudication, the plan sponsor (or the PBM device 106 on behalf of the plan sponsor) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, the pharmacy device 102 and/or the benefit manager device 106 are operated by a single entity. In other embodiments, the pharmacy device 102 and/or the benefit manager device 106 are operated by different entities. In some embodiments, the pharmacy device 102 and/or the benefit manager device 106 are jointly operated (e.g., on a single device or on a pool of devices), while in other embodiments, the pharmacy device 102 and the benefit manager device 106 are operated separately.

The patient device 108 is used by a device operator. The device operator may be an individual acting as a patient of a pharmacy, a member of a drug benefit program, or otherwise. While some illustrative embodiments may generally describe the device operator as a member, the device operator may be an individual not in the role of a member. In some embodiments, the device operator may be a patient of a pharmacy who is not a member of the PBM device 106. In addition, the device operator may be another person operating the patient device 108 on behalf of the member. Examples of such people include parents, guardians and caregivers. While the member is generally described herein as being the device operator, generally any of the aforementioned persons may be substituted for the member.

In some embodiments, the member may utilize the patient device 108 to communicate with the benefit manager (e.g., through the benefit manager device 106) or a pharmacy (e.g., through the pharmacy device 102). By way of example, the patient device 108 may communicate with the benefit manager device 106 to enable a member to have a prescription filled through a pharmaceutical delivery channel. The member operating the patient device 108 may be a person who has one or more prescription drugs prescribed to them by a medical healthcare professional.

The patient device 108 may be associated with a single member, or with multiple members. A member may use multiple patient devices. In some embodiments, the communication may not be made to the member directly through the patient device 108. For example, the member may get blocked at a retail pharmacy location from receiving a prescription drug under the drug benefit program associated with the member and then receive the notification from the pharmacist regarding the blockage. The member may also receive a letter in the mail or by email explaining the blockage.

The pharmacy device 102 and/or the benefit manager device 106 may be in communication directly (e.g., through local storage) and/or through the network 104 (e.g., in a cloud configuration or software as a service) with a memory device that stores a database 110. The database 110 may be deployed on the pharmacy device 102, the benefit manager device 106, the UAV server 107, the pharmacy devices 102, the benefit manager device 106, the UAV server 107, partially on the pharmacy device 102 and partially on the benefit manager device 106 and partially on the UAV server 107, on a separate device, or may otherwise be deployed. The database 110 may store shipping data 112, container data 114, coolant data 116, temperature model data 118, UAV data 119, weather data 117, and drug data 122.

In general, the shipping data 112 may include information regarding the pricing of various shipping modes offered by multiple different shipping carriers. The various shipping modes may include combinations of transport duration and transport type. Transport duration may include, for example, next day shipping, second day shipping, third day shipping, UAV based shipping, and so forth. Transport type may include, for example, air shipping transport, UAV shipping transport, ground shipping transport, hand carrier delivery, and so forth. The pricing of the various shipping modes may additionally include pricing information based on different package weights, sizes, and/or types, and may be imposed with different charges (e.g., fuel surcharge, residential delivery charge, delivery area surcharge, Saturday delivery charge, etc.) by the different shipping carriers. Additionally, the different shipping carriers may price differently. For example, the base shipping charge may be a different price, and additionally one of the carriers may charge an additional special fee for a particular delivery location while the other may not or may charge a different special fee for a different reason. In some embodiments, the shipping data 112 may also include information regarding pick-up times and/or delivery times for individual shipping modes and/or carriers. In some embodiments, the shipping data 112 may additionally include a route of transit.

The shipping data 112 may be created and stored by the pharmacy operating the pharmacy device 102, the benefit manager operating the benefit manager device 106, and/or one, or more than one, shipping carrier. For example, the shipping carrier may store the shipping data 112 associated with itself directly in the database 110, or may provide information to the pharmacy such that the pharmacy device stores the provided information in the form of the shipping data 112. The shipping data 112 may include data provided by the shipping carriers, data generated by the pharmacy device 102 and/or the benefit manager device 106 regarding the shipping carriers and/or its services, or otherwise.

The container data 114 may include information regarding different available insulated shipping containers utilized by the mail order pharmacy for shipping temperature sensitive drugs. The shipping container information may include, for example, the different available cooler sizes, the weight of each of the different available cooler sizes, the cost of each of the different available cooler sizes, and the size (e.g., physical external dimensions, physical internal dimensions, physical internal volume, shipping mode specific dimensional weight, shipping mode specific dimensional volume, and/or maximum weight carrying capacity) of each of the different available cooler sizes. Additional information, such as insulating characteristics (e.g., wall thickness, K value and/or R value) of each of the different cooler sizes may also be stored as part of the container data 114. The container data 114 may include data provided by the shipping carriers, data provided by the container manufacturers, data generated by the pharmacy device 102 and/or the benefit manager device 106 regarding the containers and/or its manufacturers, or otherwise.

The coolant data 116 may include, for example, information regarding the available phase change units that may be utilized by the pharmacy for shipping temperature sensitive drugs. Examples of phase change units may include, for example, frozen gel packs, which may undergo a phase change or partial phase change to liquid form while absorbing heat and maintaining constant temperature within a cooler, and liquefied gel packs, which may undergo a phase change or partial phase change to solid form while releasing heat and maintaining constant temperature within a cooler. The coolant data 116 may include, for example, the weight of each frozen and/or liquefied gel pack, the cost of each frozen and/or liquefied gel pack, the physical dimensions of each frozen and/or liquefied gel pack, and/or the volume of each frozen and/or liquefied gel pack. In some embodiments, multiple sizes (e.g., physical dimensions and/or weight) of frozen and/or liquefied gel packs, and/or types (e.g., different chemical compositions and/or melting points) of frozen and/or liquefied gel packs are used. The coolant data 116 may include data provided by the shipping carriers, data provided by the container manufacturers, data provided by the phase change unit manufacturers, data generated by the pharmacy device 102 and/or the benefit manager device 106 regarding the phase change unit and/or its manufacturers, or otherwise.

The temperature model data 118 may include experimentally obtained and/or determined information regarding the different internal temperature vs. time profiles associated with different cooler, external temperature, and frozen and/or liquefied gel pack combinations. For example, the temperature model data 118 may include experiment information regarding the duration for which a specified temperature (e.g., which may include a specified temperature range, and/or a temperature below a specified threshold temperature) may be maintained within different sized coolers having different numbers of frozen gel packs (and/or liquefied gel packs, and/or combinations of frozen and liquefied gel packs) disposed within the cooler under different external conditions and different durations. In some embodiments, the temperature model data 118 may include temperature modeling equations utilizing the many aforementioned variables (e.g., cooler, gel packs, external conditions, and duration). Additional variables or a lesser number of variables may also be used. In some embodiments, the temperature model data 118 may be utilized for improving accuracy through experimental results (e.g., by modifying a variable within the temperature modeling equations to achieve equivalent internal temperature profiling given an external temperature, cooler, and frozen and/or liquefied gel pack combination). In other embodiments, the temperature model data 118 may be exclusively based on experimental results. In such a model, a very large array of experimental results may be collected, as there may be many variables that affect the internal temperature of a cooler, and many possibilities of external temperature profiles. In some embodiments, the temperature model data 118 may be received from the FDA, directly from the manufacturer, or otherwise and stored in the database 110.

The drug data 122 may include drug name (e.g., technical name and/or common name), other names by which the drug is known by, active ingredients, an image of the drug (e.g., in pill form), and the like. The drug data 122 may include a dosage format (e.g., pill, spray, or liquid) and/or the packaging formats (e.g., filled bottle, filled blister packaging, or pre-filled unit of use packaging), that are available to or for the drug. The drug data 122 may include information associated with a single medication or multiple medications.

The drug data 122 may include information regarding each drug that may require temperature-controlled storage. The information regarding the drugs may include, for example, the size of different containers for the drug, the weight of the drug, and a recommended storage temperature for the drug. The drug data 122 may include specific perishability attributes of the drugs indicating how long the drugs need to be cooled and at what temperature they need to be kept to avoid spoilage of the drugs. The drug data 122 may specify how long the drugs will last before they spoil if the perishability attributes are not met (e.g., if the temperature exceeds the minimum cooling temperature of the drugs). The size of the different containers for the drug may include, for example, the physical dimensions of each container and/or the volume of the container. The weight of the drug may include, for example, the combination weight of the drug and packaging container. The recommended storage temperature may include, for example, a minimum storage temperature, a maximum storage temperature, and the like.

In some embodiments the drug data 122 may additionally include drug information related to allowable excursion outside of the recommended storage temperature range (e.g., absolute minimum temperature, allowed duration below the minimum storage temperature, absolute maximum temperature, and/or allowed duration above the maximum storage temperature). The drug data 122 may include data provided by the drug manufactures, data provided by governmental organizations, data generated by the pharmacy device 102 and/or the benefit manager device 106 regarding the drugs, or otherwise. The drug data 122 may identify drugs that have a perishable attribute that exceeds a threshold. For example, the drug data 122 may identify drugs that can be temperature controlled for a given period of time before they spoil. The UAV server 107 may automatically package drugs having similar perishable attributes together into the same package that is obtained and delivered by the distance UAV 105 to a regional hub. The UAV server 107 may select packaging material to add to the package to avoid spoilage of the drugs in the same package based on the drug data 122. In some cases, the UAV server 107 determines weather conditions, temperature, and duration of travel for the travel path from the distance hub where the distance UAV 107 obtains the package to the target delivery destination where the local UAV 109 delivers the drug. The UAV server 107 then selects packaging material to avoid spoilage of the drugs for the duration of the travel and based on the weather conditions and temperature of the travel path.

In some cases, the UAV server 107 determines that sufficient packaging material is not available to prevent spoilage of the drugs, such as because of the weight needed by the packaging material because of the duration of the travel, lack of available local UAVs 109 with sufficient resources (e.g., battery power) to obtain and deliver the drugs, current weather conditions at the destination, wind speed and conditions along the path to the destination, or other suitable factors. In such cases, the UAV server 107 provides an alert to the recipient or member notifying the recipient or member that UAV delivery of the drugs is not available. The notification may allow the recipient or member to select an alternate delivery means, such as picking up the drugs from the distance or regional hub, or having the drugs delivered by courier, or delaying delivery of the drugs for another day or specified time period.

To obtain and deliver packages, the distance UAV 105 and the local UAV 109 use a camera and/or RFID reader. A camera or image capture device of the local UAV 109 and/or distance UAV 105 may continuously capture a video feed to identify and retrieve a package or item from a package. The video feed captured by the camera is processed on-the-fly by an onboard image processor of the UAV 109 and/or UAV 105 to recognize a package or items in a package. The image processor may identify physical properties of the package or items in the package. The camera may have a wide angled lens configured for providing a viewing range of 360° around an operatively upright axis, and greater than 180° in both remaining axes orthogonal to the upright axis. This wide angled camera may be mounted on a lower side of the UAV body, thereby to continuously capture substantially everything below and at the vertical level of the UAV 109 and/or UAV 105, in use.

In some cases, the UAV 109 and/or UAV 105 includes a radio-frequency identification (RFID) reader. The RFID reader allows the UAV 109 and/or UAV 105 to obtain information about a package or items in a package when the UAV 109 and/or UAV 105 comes within a threshold proximity of the package or items in the package. For example, the distance UAV 105 may read information from a package that identifies the weight of the package, number of items in the package, and target delivery destination of the package when the distance UAV 105 is within 15 feet of the package. Similarly, the local UAV 109 may read information from an item in a package that identifies the weight of the item, type of item (e.g., whether the item is perishable), and the target delivery destination of the item when the distance local UAV 109 is within 3 feet of the item. In some cases, the distance UAV 105 may include an RFID reader that is configured to read an RFID tag from a larger distance than the RFID reader of the local UAV 109.

While the system 100 in FIG. 1 is shown to include single devices 102, 106, and 108 multiple devices may be used. The devices 102, 106, and 108 may be the same type of device or may be different device types. When multiple devices are present, the multiple devices may be of the same device type or may be of different device types. Moreover, system 100 shows a single network 104, however, multiple networks can be used. The multiple networks may communicate in series with each other to link the devices 102, 106, and 108 or in parallel to link the devices 102, 106, and 108. The multiple networks may communicate in series or in parallel with each other to link the IoT devices 132*a-b*, 133*a-b* and 134*a-b* associated with respective locations 130*a-b* with the servers 105 and/or 107.

Figure 2:
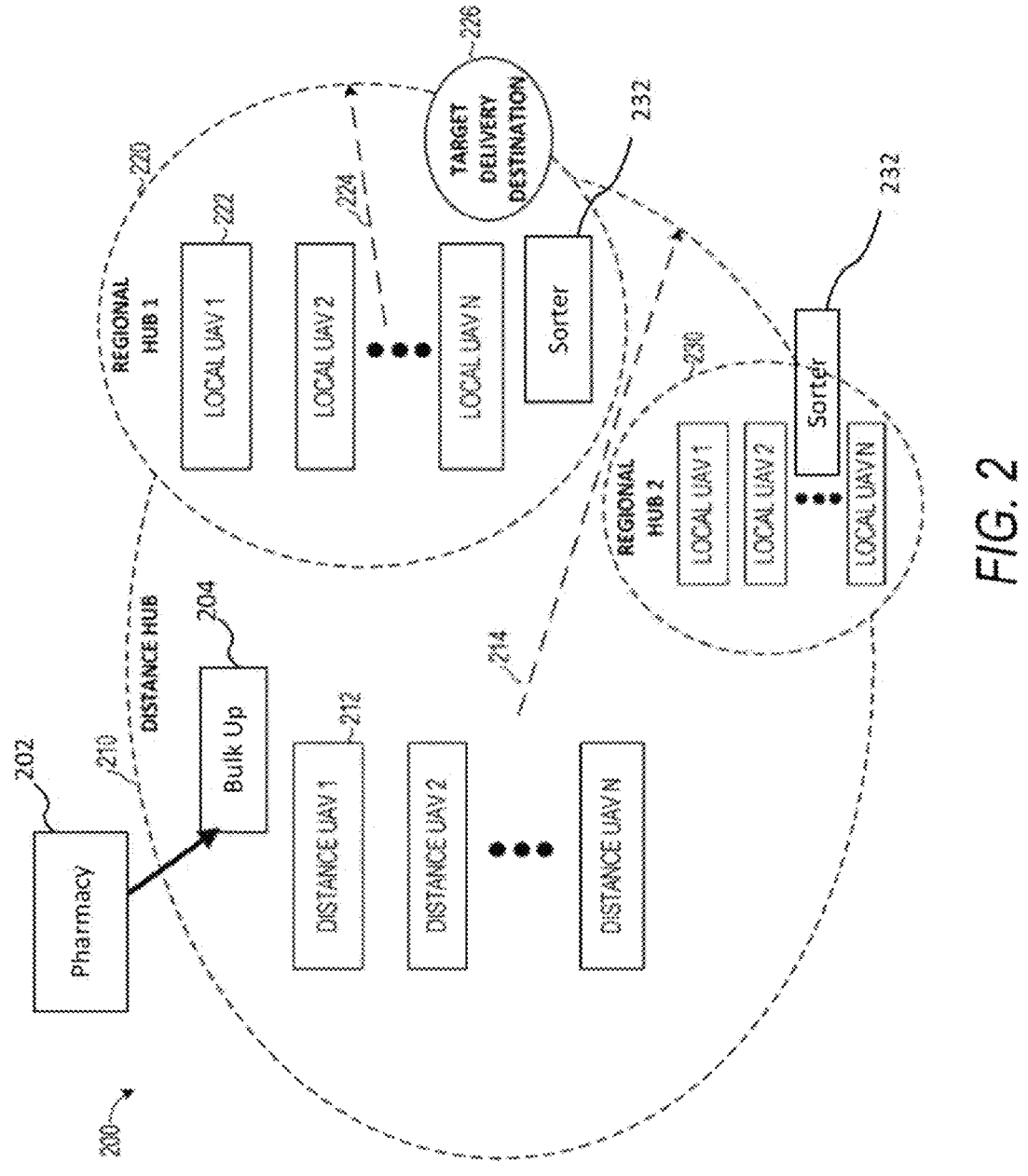
FIG. 2 is a block diagram of an example distance hub and regional hub package exchange system, according to some embodiments.

FIG. 2 is a block diagram of an example distance hub and regional hub package exchange system 200, according to some embodiments. In some cases, there may be multiple distance hubs 210 and multiple regional hubs 220 and 230 although only one distance hub and two regional hubs are shown in the system 200. The distance hub 210 may be a pharmacy 202 or other medication and/or medical product distributor where a distance UAV 212 is loaded with a distance payload to deliver to a regional hub. One exemplary embodiment of a pharmacy is described with regard to reference 1300 of FIG. 13, including additional detail. Bulk up operations 204 are included as part of the pharmacy operations, and the bulk up operations 204 are described in further detail with regard to reference 1412 of FIG. 14. An example of a pharmacy is a mail order pharmacy, e.g., a pharmacy as described in U.S. Patent Publication No. 2013/0000260, filed 21 Feb. 2012, which is hereby incorporated by reference. The distance hub 210 may include multiple distance UAVs 212. Distance UAVs 212 are configured to perform point-to-point travel, or in other words, to travel from a first location to a second location without requiring additional stops between the first location and the second location (e.g., a direct flight). In the example scenario shown in FIG. 2, the distance UAV 212 travels from the distance hub 210 to a first regional hub 220 or a second regional hub 230. To complete travel and delivery operations on a point-to-point basis, and accommodate the associated longer flight distances, certain embodiments of a distance UAV 212 may include a battery capacity significantly greater than a local UAV 222. Other embodiments of a distance UAV 212 may include an internal combustion engine instead of a battery powered system. In this example, the distance UAV 212 performs point-to-point travel using forward motion produced by the internal combustion engine, but may also include a battery to power an ignition or other mechanism peripherally connected to the internal combustion engine. In this scenario, the distance UAV 212 does not rely on a battery to power its movement or travel. As described herein, distance UAVs 212 are implemented as fixed-wing aircraft that are incapable of performing hover operations. In an example embodiment, the distance UAV produces lift when it travels in a forward direction and lacks hover capability. Each distance UAV 212 is capable of carrying a package of a plurality of items (e.g., prescriptions) over a first distance 214 (e.g., 10-15 miles) to reach a regional hub (e.g., a first regional hub 220 or a second regional hub 230). The distance UAV 212 is capable of carrying larger and heavier cargo than a given local UAV 222. Embodiments of a distance UAV 212 are configured to carry and transport a distance payload that includes a plurality of regional payloads to the regional hub 220, 230. Each regional payload includes one or more prescription medications to be delivered to a single target delivery destination. In other words, a regional payload is a parcel of one or more medications and/or medical products originating from a pharmacy (e.g., distance hub 210) for delivery to an individual patient at his location (e.g., target delivery destination 226). The distance UAV 212 delivers the distance payload to a regional hub 220, 230, where each of the local UAVs 222 obtains one of the regional payloads and transports the individual regional payload to a target delivery destination 226.

In some embodiments, the distance UAV 212 may be instructed by UAV server 107 to pick up a package of items for delivery to a regional hub (e.g., the first regional hub 220). The package of items may include a plurality of items that have been selected by UAV server 107 for delivery to target destinations that are within the first regional hub 220. As shown, each regional hub includes a plurality of local UAVs 1, 2, . . . n, and a sorter 232 for each local UAV to obtain a regional payload from the distance payload transported by the distance UAV 212. Embodiments of the sorter 232 may include a robotic arm or other mechanism operable to physically grasp, lift, and move an item from the distance UAV or from the distance payload at any intermediary location into a cargo holding or storage area of the local UAV 222.

In one embodiment, the sorter 232 operates to unpack a bulk container that houses the distance payload comprising a plurality of regional payloads. The sorter 232 grips and lifts each of the regional payloads from the bulk container and places each of the regional payloads on a stand, table, shelf, platform, or other setting for retrieval by one of the local UAVs 222. In certain embodiments, each of the regional payloads is tagged using machine-readable code, and a particular local UAV 222 assigned to retrieve a particular regional payload can approach the retrieval area, scan or otherwise electronically read the machine-readable code to identify the particular regional payload, and then the local UAV 222 can retrieve the regional payload by gripping, lifting, and storing the regional payload in a cargo hold area of the local UAV 222.

Each regional hub 220 and 230 may include multiple local UAVs 222. Embodiments of local UAVs 222 include battery-powered, rotary-wing, rotorcraft, multi-rotor aircrafts capable of performing lateral movement and hover operations to complete deliveries. A local UAV is, in example embodiments, a heavier-than-air aircraft with rotary wings or rotor blades, which generate lift by rotating around a vertical mast. In an example embodiment, the local UAVs can hover in place and does not require forward motion to maintain lift. In contrast to a distance UAV 212 that is adapted to land at a specialized, aircraft-specific location (e.g., a runway, a landing pad), Local UAVs 222 are adapted to access different types of delivery sites near a patient's home or other applicable location. More specifically, local UAVs 222 use multiple rotors to perform lateral movement and hover operations to access a porch, a balcony, a garage, a second floor (or greater elevation) apartment, an elevated delivery receptacle, above ground delivery site, or other site specified for medication delivery purposes. Each local UAV 222 is capable of carrying an item (from a package of items that has been delivered by a distance UAV 212) to the target delivery destination 226. Each local UAV 222 is capable of carrying one or more items from the package over a second distance 224 (e.g., 2-3 miles) that is shorter than the first distance 214 over which the distance UAV 212 can travel. The weight that the local UAV 222 is able to carry is also lower than the weight the distance UAV 212 is able to carry.

In an example embodiment, there can be more than one distance UAV 212 with deliveries of the package from a first distance hub to a second distance hub and so on until the last distance UAV 212 delivers the package to the regional hub 220, 230.

Figure 4:
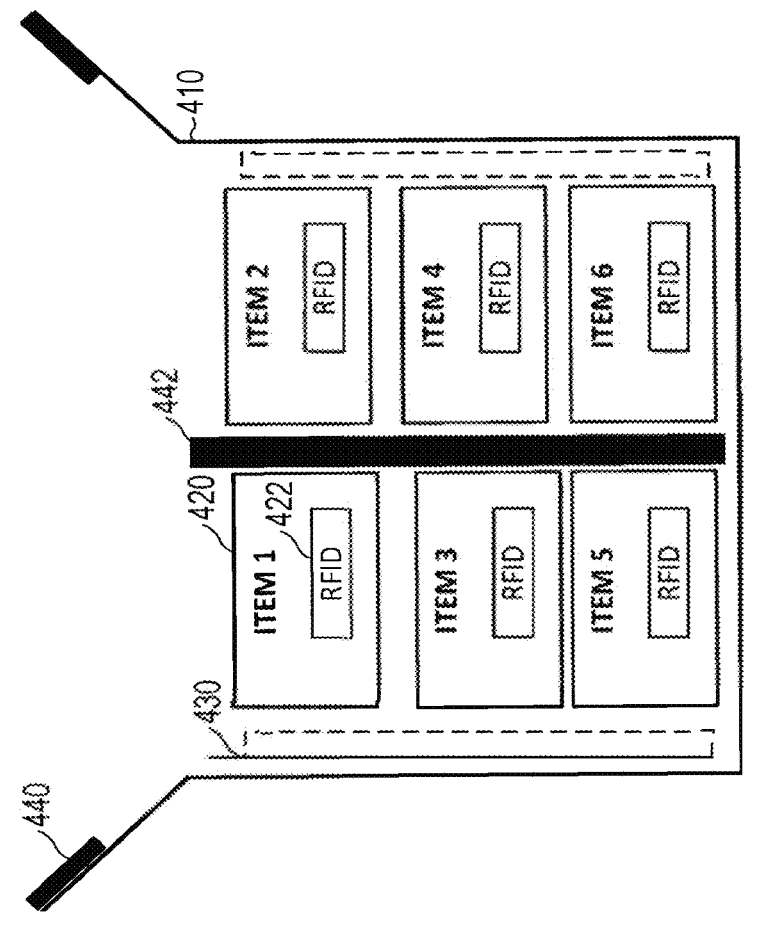
FIG. 4 is an illustrative package with items to be delivered by a UAV, according to some embodiments.

In some embodiments, upon reaching the first regional hub 220, the distance UAV 212 drops the package of items at a designated location at the first regional hub 220. The package of items receives an indication from the distance UAV 212 and/or from the UAV server 107 that the package has arrived. In response to receiving the indication, the package may automatically open to expose the items within the package. The package may include one or more than one door that is biased open. A latch may hold the doors closed and upon receipt of an open package signal, releases the doors which are now free to open, which can be their normal biased condition. The doors can also be an electromagnetic mechanism 442 and 440 that holds the doors closed and pushes the doors open. The electromagnetic mechanism may include an electromagnetic component 440 on each door of the package and an electromagnetic component 442 inside of the package coupled to a controller and power source (not shown). These components can open and close the doors in response to control signals from the controller to the electromagnetic components. As shown in FIG. 4, a package 410 may include a plurality of items 420 (e.g., individual prescriptions). As shown in FIG. 4, the package has opened to expose the plurality of items 420. Each item in the package includes an RFID tag 422. The RFID tag 422 includes information that identifies the contents of the item (e.g., the name of the prescription, the weight of the prescription, delivery parameters (such as level of urgency and whether the prescription needs to be kept at a certain temperature to avoid spoilage), the target delivery destination, and/or delivery recipient information).

The package 410 may transmit a beacon signal once the package opens to instruct the local UAVs 222 to begin picking up items from the package. For example, a first local UAV 222 may hover over the package 410 and read the contents of a first item from the RFID tag 422 of the item. The first local UAV 222 may determine the target destination and flight conditions (e.g., wind speed, weather, path information, and so forth). The first local UAV 222 may compute an estimated amount of flight resources (e.g., amount of battery charge) needed to perform a round trip delivery of the item associated with the RFID tag 422 to the target delivery destination. In some cases, the first local UAV 222 may communicate the information or some of the information from the RFID tag 422 and current resource information of the first local UAV 222 (e.g., a current battery level charge, a current amount of cargo or weight being carried by the first local UAV 222, and path information, such as the current wind speed prediction and weather information) to the UAV server 107. The UAV server 107 and/or the first local UAV 222 may determine whether the first local UAV 222 has sufficient amount of resources (e.g., available weight and storage space and/or battery level) to deliver the item associated with the RFID tag 422 to the target delivery destination and return to the first regional hub 220.

In response to determining that sufficient amount of resources are available to the first local UAV 222, the first local UAV 222 hovers over the item associated with the RFID tag 422 and obtains the item (e.g., captures the item and adds it to the cargo area of the first local UAV 222). The first local UAV 222 lifts off and flies to each delivery destination associated with each item the first local UAV 222 carries and drops the item at the respective delivery destinations.

The local UAVs 222 at the regional hub may include UAVs with different delivery profiles. A first type of local UAVs 222 may include larger batteries that hold more charge than a second type of local UAVs. The first type of local UAV may deliver items a greater distance than a second type of local UAVs. A third type of local UAV may have different rotors than provide greater lift than the first type or second type of UAV. These performance specifications of the UAV or drone type can be used to determine if a specific drone can deliver a specific item to the item's delivery location. The UAV server can also develop UAV models that represent the performance of the local UAV types at a specific hub. The model can be based on the actual historical delivery performance of the types of UAVs or drones. The UAV model can also be developed across all of the hubs for the UAV types. The model can include the item, its packaging, and if a specific UAV type has successfully delivered this item at the regional hub or across the entire delivery system over a delivery threshold. The delivery threshold can be set to a high value, e.g., greater than 90%, 95%, 97%, 99%, 99.99%, successful delivery history. The servers can use the UAV model to determine if a specific item can be delivered using any path, e.g., distance UAV to regional UAV.

In response to determining that an insufficient amount of resources are available to the first local UAV 222, the first local UAV 222 may skip over the item and attempt to obtain another item that is in the package. Also, the UAV server 107 may instruct a second local UAV 222 in the regional hub 220 to try to pick up the item that the first local UAV 222 does not have sufficient resources to pick up. In some cases, the second local UAV 222 may determine the target destination and flight conditions (e.g., wind speed, weather, path information, and so forth). The second local UAV 222 may compute an estimated amount of flight resources (e.g., amount of battery charge) needed to perform a round trip delivery of the item associated with the RFID tag 422 to the target delivery destination. In some cases, the second local UAV 222 may communicate the information or some of the information from the RFID tag 422 and current resource information of the second local UAV 222 (e.g., a current battery level charge, a current amount of cargo or weight being carried by the second local UAV 222, and path information, such as the current wind speed prediction and weather information) to the UAV server 107. The UAV server 107 and/or the second local UAV 222 may determine whether the second local UAV 222 has sufficient amount of resources (e.g., available weight and storage space and/or battery level) to deliver the item associated with the RFID tag 422 to the target delivery destination and return to the first regional hub 220. If the second local UAV 222 is determined to have sufficient resources to deliver the item to the target destination, the second local UAV 222 obtains the item from the package and delivers the item to the target destination.

In some embodiments, if the second local UAV 222 does not have sufficient resources and a threshold number of local UAVs 222 at the first regional hub 220 have attempted to obtain and deliver the same item, the UAV server 107 may attempt to deliver the item by other means. For example, if weather and/or wind conditions associated with a delivery path for delivering an item to a delivery destination require more resources by UAVs to deliver the item than is normally available, a threshold number (e.g., three UAVs) may be unable to deliver the item even when such UAVs are not carrying any other cargo and have full battery charge. As another example, if the temperature associated with a delivery path and/or destination of the item exceeds the available amount of temperature control material of the item available, a threshold number (e.g., three UAVs) may be unable to deliver the item in a way that avoids spoilage of the item. In such cases, the UAV server 107 may obtain contact details for the recipient of the item from the RFID tag 422. The UAV server 107 may send a notification to a client device of the recipient informing the recipient that the item cannot be delivered by a UAV to the recipient. An illustrative notification is shown and described in connection with FIG. 5.

For example, the UAV server 107 may generate a prompt for display on the client device of the recipient indicating that UAV delivery is not currently available due to a condition (e.g., temperature, wind, weather, and so forth). The prompt may provide a plurality of alternate delivery options for the recipient to select. For example, the prompt shown in FIG. 5 includes a pick up item from regional hub option, a wait for later delivery option, and a deliver by courier option. If the recipient selects the pick up item from the regional hub option, the item may be placed in a pick up zone in the first regional hub 220 for the recipient to pick up. If the recipient selects the wait for later delivery option, the UAV server 107 may attempt to deliver the item to the recipient by way of UAV at a later time (e.g., another day when the conditions for UAV delivery are better). If the user selects a deliver by courier option, the UAV server 107 schedules a regular mail or express mail delivery of the item to the recipient.

In some embodiments, a first distance hub 210 may include a first set of distance UAVs and a second distance hub (not shown) may include a second set of distance UAVs. When delivering items to a very distant location, multiple distance hubs and distance UAVs may be employed before finally employing a local UAV at a regional hub to deliver the item to the target destination. For example, a first distance UAV at the first distance hub 210 may pick up or obtain a package of items to be delivered to one or more recipients that are within range of a local UAV at a regional hub. The first distance UAV may be incapable of delivering the package to the regional hub but may be capable of delivering the package to the second distance hub. As such, the first distance UAV delivers the package to the second distance hub. Then a second distance UAV picks up or obtains the package (or one or more items in the package) and delivers the package to the regional hub. The local UAV at the regional hub may obtain or pick up one or more items from the package and deliver the item to the target recipient.

In some cases, the local UAV 222 at the first regional hub 220 may provide weather conditions and/or surface and/or wind conditions currently present within a vicinity of the first regional hub 220 to the distance hub 210. For example, the local UAV 222 may provide such information to the UAV server 107. The UAV server 107 may transmit instructions for packaging items into the package at the distance hub 210 based on the weather conditions and/or surface and/or wind conditions currently present within a vicinity of the first regional hub 220, as reported by the local UAV 222. The distance hub 210 may add a sufficient amount of temperature control material 430 (e.g., ice packs and/or insulation) to the package 410 to prevent spoilage of the items 420 that are in the package 410. The temperature control material 430 may be selected to account for the duration of travel the distance UAV 212 takes to deliver the package to the first regional hub 220 and/or the duration of time the package is expected to sit on the surface at the first regional hub 220 and/or the temperature of the surface (and type of the surface, such as stone, concrete, wood, grass, and so forth) at the first regional hub 220 before all of the items in the package are obtained by the local UAV 222 at the first regional hub 220. For example, the UAV server 107 may determine that the surface temperature at the first regional hub 220 is 45 degrees Celsius, the travel time (based on current wind and weather conditions) to reach the first regional hub 220 from the distance hub 210 is 2 hours, and the package, once delivered to the first regional hub 220, is expected to sit for 3 hours before having all of its items obtained by the local UAVs at the first regional hub 220. Accordingly, the UAV server 107 may select packaging material 430 that can preserve (or prevent spoilage) of the items 420 in the package 410 for a period of 5 hours and that can withstand 45 degree Celsius temperature for a minimum of 3 hours.

In an example embodiment, the regional hub receiving the distance UAV is a fixed location. The regional hub can include infrastructure to facilitate the deposit of the package containing multiple items at the regional hub. The regional hub can include a first beacon to guide the distance UAV to the regional hub and a second beacon to designate the landing pad for the package of items. In an example embodiment, a plurality of landing pads can be designated with a hanger. A distance UAV is assigned to one of these landing pads. Each landing pad can have a beacon that identifies the landing pad to the distance UAV with the UAV storing the beacon identification of the landing pad. In an example embodiment, the landing pad beacon transmits a transponder code that is individual to the distance UAV. The distance UAV follows the first beacon to get within a first distance of the regional hub and then switches to follow the second beacon to land at the assigned landing pad or drop its payload, e.g., the package enclosing multiple items, at the landing pad.

It is within the scope of the present disclosure to deliver the package of items to the distance hub using ground-based transportation. The ground-based transportation can be a delivery truck or van. The package can then be loaded onto the distance UAV for delivery to the regional hub for final delivery to the item destination location. The ground-based delivery transportation can be an autonomous vehicle. A combination of delivery vehicles can be used to deliver the item.

In an example embodiment, the distance UAV can fly a first distance. In the case where the regional hub is near the first distance, then the delivery area for an item can be greater than the first distance with the addition of a second distance that the local UAV can fly. The total distance the item to be delivered can fly is less than twice the first distance as the local UAV does not fly as far as the distance UAV.

In an example embodiment, a distance UAV 212 can fly one way to deliver a container with multiple items to a regional hub. The distance UAV 212 can electronically connect to a distance UAV charger at the regional hub. The distance UAV 212 can then increase its distance from the distance hub to a regional hub by recharging at the regional hub. The distance UAV 212 needs to be at a full charge if there is no headwind on the return flight to the distance hub and does not carry a payload. In an example, the distance UAV only needs a half charge or a three-quarters charge to return to the distance hub.

Figure 3:
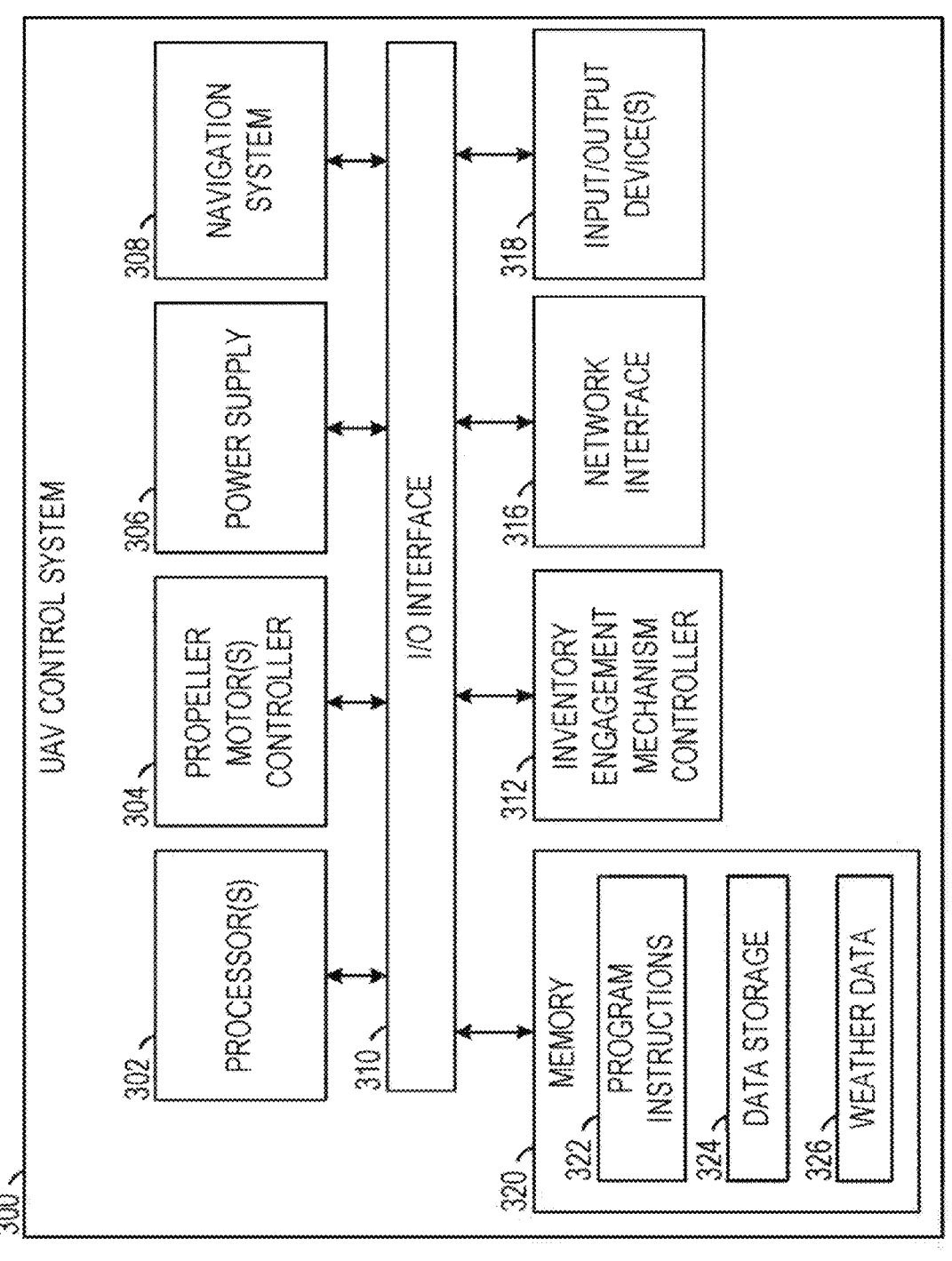
FIG. 3 is a block diagram illustrating an example unmanned aerial vehicle (UAV) control system, according to some embodiments.

FIG. 3 is a block diagram illustrating an example UAV control system 300 of the UAV 109 and/or 105 according to some embodiments. In various examples, the block diagram may be illustrative of one or more aspects of the UAV control system 300 that may be used to implement the various systems and methods discussed below. In the illustrated implementation, the UAV control system 300 includes one or more processors 302, coupled to a non-transitory computer readable storage medium 320 or non-transitory processor-readable storage medium 320 via an input/output (I/O) interface 310. The UAV control system 300 may also include a propeller motor controller 304, such as an electronic speed control (ESC), a power module 306 and/or a navigation system 308. The UAV control system 300 further includes an inventory engagement mechanism controller 312, a network interface 316, and one or more input/output devices 318.

In various implementations, the UAV control system 300 may be a uniprocessor system including one processor 302, or a multiprocessor system including several processors 302 (e.g., two, four, eight, or another suitable number). The processor(s) 302 may be any suitable processor capable of executing instructions. For example, in various implementations, the processor(s) 302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 302 may commonly, but not necessarily, implement the same ISA.

The non-transitory computer readable storage medium 320 may be configured to store executable instructions, data, navigation paths and/or data items accessible by the processor(s) 302. In various implementations, the non-transitory computer readable storage medium 320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium

320 as program instructions 322, data storage 324 and weather data 326, respectively. In other implementations, program instructions, data and/or voice data may be received, sent or stored upon different types of computer-accessible media, such as non-transitory media, or on similar media separate from the non-transitory computer readable storage medium 320 or the UAV control system 300. Generally speaking, a non-transitory, computer readable storage medium may include storage media or memory media such as magnetic or optical media, e.g., disk or CD/DVDROM, coupled to the UAV control system 300 via the I/O interface 310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 316.

In one implementation, the I/O interface 310 may be configured to coordinate I/O traffic between the processor(s) 302, the non-transitory computer readable storage medium 320, and any peripheral devices, the network interface 310 or other peripheral interfaces, such as input/output devices 318. In some implementations, the I/O interface 310 may perform any necessary protocol, timing or other data transformations to convert data signals from one component (e.g., non-transitory computer readable storage medium 320) into a format suitable for use by another component (e.g., processor(s) 302). In some implementations, the I/O interface 310 may include support for devices attached through various types of peripheral buses, such as a variant of the Peripheral Component Interconnect (PCI) bus standard or the Universal Serial Bus (USB) standard, for example. In some implementations, the function of the I/O interface 310 may be split into two or more separate components, such as a north bridge and a south bridge, for example. Also, in some implementations, some or all of the functionality of the I/O interface 310, such as an interface to the non-transitory computer readable storage medium 320, may be incorporated directly into the processor(s) 302.

The propeller motor(s) controller 304 communicates with the navigation system 308 and adjusts the power of each propeller motor to guide the UAV 109 or 105 along a determined navigation path to a delivery location, or for any other flight, land, or water navigation path. The navigation system 308 may include a satellite navigation, e.g., a GPS, GLONASS, BeiDou, or Galileo or other similar system, that can be used to navigate the UAV 109 or 105 to and/or from a delivery location (e.g., to/from a regional hub to/from a distance hub or to/from a recipient to/from a regional hub), a user location, or any other suitable preprogramed or dynamically determined motions, movements, or paths. The propeller motor(s) controller 304 can adjust the power of each propeller motor based on current or predicted weather conditions along the travel path. In some cases, the propeller motor(s) controller 304 adjusts the power of each propeller motor to select an altitude for flying the UAV to reduce the outside temperature and preserve perishable items in the package being carried by the UAV to prevent spoilage. Namely, if a lighter package with less temperature control material is obtained by a given UAV, the given UAV may fly at a higher altitude where the outside temperature is lower to prolong the life of the items and prevent spoilage for a longer period of time.

The inventory engagement mechanism controller 312 communicates with the motor(s) (e.g., a servo motor) used to engage and/or disengage a payload (cargo), inventory, item retrieved from a field of view, or any other suitable object (e.g., package, item, container, and so forth) coupled to the UAV. For example, when the UAV 109 or 105 is positioned over a level surface at a delivery location, the inventory engagement mechanism controller 312 may provide an instruction to a motor that controls the inventory engagement mechanism to release or obtain the inventory. By way of further example, in response to one or more instructions from the UAV server 107, the UAV 109 or 105 may retrieve a selected or specified object appearing within a field of view of a camera coupled to the UAV. Upon a further command or responsive to arrival at a selected or predetermined location, the inventory engagement mechanism controller 312 may release the object.

The network interface 316 may be configured to allow data to be exchanged between the UAV control system 300, other devices attached to a network, such as other computer systems, and/or with UAV control systems of other UAVs. For example, the network interface 316 may enable wireless communication between numerous UAVs that are transporting inventory to various delivery destinations; interacting with users; performing coordinated maneuvers for audiovisual, video, or image capture operations; or operating within a suitable proximity. In various implementations, the network interface 316 may support communication via wireless general data networks, such as a Wi-Fi network. For example, the network interface 316 may support communication via telecommunications networks such as cellular communication networks, satellite networks, and the like.

Input/output devices 318 may, in some implementations, include one or more displays, image capture devices, thermal sensors, infrared sensors, time of flight sensors, accelerometers, pressure sensors, weather sensors, RFID readers, etc. Multiple input/output devices 318 may be present and controlled by the UAV control system 300. One or more of these sensors may be utilized to assist in the landing as well as avoid obstacles during delivery and/or engagement of inventory. For example, utilizing a location signal from the satellite navigation, e.g., the GPS receiver and one or more IR sensors, the UAV may safely land on a location designated by the UAV server 107. The IR sensors may be used to provide real-time data to assist the UAV in avoiding moving/movable obstacles. The RFID reader can be used to read the contents of a given package or item to be delivered.

As shown in FIG. 3, the memory 320 may include program instructions 322 which may be configured to implement the example processes and/or sub-processes described above. The data storage 324 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

FIGS. 6 and 7 are flowcharts illustrating example operations of the UAV delivery system in performing processes 600 and 700, according to example embodiments. The processes 600 and 700 may be embodied in computer-readable instructions for execution by one or more processors such that the operations of the processes 600 and 700 may be performed in part or in whole by the functional components of the UAV server 107, the processors in a distance UAV or the processors in the local UAV; accordingly, the processes 600 and 700 is described below by way of example with reference thereto. However, in other embodiments, at least some of the operations of the processes 600 and 700 may be deployed on various other hardware configurations. Some or all of the operations of processes 600 and 700 can be in parallel, out of order, or entirely omitted.

At operation 601, a distance UAV obtains a package that includes a plurality of items, each item is associated with a target delivery destination. For example, a distance UAV can pick up a package of items at a distance hub. In some embodiments, the UAV server 107 instructs or causes the distance UAV 105 to obtain the package by transmitting information to the distance UAV 105 and/or the package authorizing the distance UAV 105 to pick up the package.

At operation 602, the distance UAV delivers the package to a regional hub that includes a local UAV. The distance UAV is configured to travel a longer distance and carry more weight than the local UAV. In some embodiments, the UAV server 107 instructs the distance UAV 105 to deliver the package to the regional hub by providing destination instructions to the distance UAV 105.

At operation 603, the local UAV retrieves a given item of the plurality of items from the package. In some embodiments, the UAV server 107 instructs the local UAV 109 to pick up and obtain a given item from the plurality of items in the package. For example, the UAV server 107 sends an RFID or other identifier of a specific item in the package to the local UAV 109 with destination instructions and a request for the local UAV 109 to pick up the specific item. In some cases, the UAV server 107 informs the local UAV 109 that the package of items has arrived at the regional hub and requests that the local UAV 109 attempt to pick up a given item in the package.

At operation 604, the local UAV determines the target delivery destination associated with the given item. For example, the local UAV reads an RFID tag associated with the item to determine various delivery parameters of the item, such as the GPS coordinates (e.g., satellite navigation coordinates) of the target destination, the weight of the item, and whether the item is perishable. In some embodiments, the UAV server 107 transmits instructions to the local UAV 109 identifying the delivery destination and/or various flight path parameters for reaching the destination.

At operation 605, the local UAV delivers the given item to the target delivery destination. In some embodiments, the UAV server 107 detects that the local UAV 109 has reached the target delivery destination, such as by tracking satellite navigation (e.g., GPS) coordinates in real-time from the local UAV 109. Specifically, the UAV server 107 may determine that the current GPS coordinates of the local UAV 109 are within a threshold distance (e.g., 5 meters) of the GPS coordinates of the target delivery destination. In response, the UAV server 107 may transmit instructions to the local UAV 109 to release or drop the item associated with the target delivery destination. The UAV server 107 may then send a notification to the recipient at the target delivery destination indicating that the item has been delivered by the UAV.

In some embodiments, the processes of FIG. 6 perform a method for delivering items to a destination using multiple UAVs. The method includes operations comprising: signaling, by a UAV server, to a distance UAV to obtain a package that includes a plurality of items, each item being associated with a target delivery destination. The operations further comprise causing the distance UAV to deliver the package to a regional hub that includes a local UAV, the distance UAV being configured to travel a longer distance and carry more weight than the local UAV. The operations further comprise signaling, by the UAV server to the local UAV to retrieve a given item of the plurality of items from the package. The operations further comprise causing the local UAV to deliver, the given item to a target delivery destination associated with the given item. In some cases, the operations include receiving, by the UAV server, from the local UAV a target delivery destination associated with the given item.

In some embodiments, after operation 602, the UAV server 107 and/or the distance UAV 105 and/or the local UAV 109 perform the process 700 (FIG. 7).

At operation 701, the UAV server 107 causes the package to be opened after being delivered to the regional hub. For example, the UAV server 107 causes the package 410 to open automatically to expose or provide access to the items 420 by one or more local UAVs at the regional hub.

At operation 702, the local UAV obtains item information for the given item.

At operation 703, the local UAV determines, based on the item information, whether the local UAV has sufficient amount of resources available for delivering the given item from the regional hub to the target delivery destination. For example, the local UAV may determine the target destination and flight conditions (e.g., wind speed, weather, path information, and so forth). The local UAV may compute an estimated amount of flight resources (e.g., amount of battery charge) needed to perform a round trip delivery of the item associated with the item information to the target delivery destination. In some cases, the local UAV may communicate the information or some of the item information and current resource information of the local UAV (e.g., a current battery level charge, a current amount of cargo or weight being carried by the local UAV, and path information, such as the current wind speed prediction and weather information) to the UAV server 107. The UAV server 107 and/or the local UAV may determine whether the local UAV has sufficient amount of resources (e.g., available weight and storage space and/or battery level) to deliver the item associated with item information to the target delivery destination and return to the first regional hub.

At operation 704, to determine whether sufficient resources are available, a total range remaining for the local UAV to travel based on a plurality of factors is computed. The plurality of factors includes current weather conditions at the regional hub, cargo weight currently held by the local UAV combined with a weight of the given item, a total distance of a path from the regional hub to each destination of items in the cargo and back to the regional hub, wind speed and direction along the path, and availability of charging stations along the path. The total range may be compared with a threshold (e.g., a maximum allowable range of the UAV) and if the total range exceeds the threshold, at operation 704, the local UAV is instructed to retrieve the given item and deliver the item to the target destination. For example, the local UAV may be carrying multiple items to be delivered to multiple recipients. The local UAV may generate a path for delivering the multiple items, such as a shortest distance path or path that avoids extreme weather conditions. The local UAV may compute how much power or battery is needed to deliver all of the multiple items to the multiple recipients along the path taking into account reduced weight of the cargo as each item is delivered and weather conditions and wind speed and direction changes along the path. The local UAV uses this information to determine a current total range including a path to deliver the items and return to the base at the regional hub. The local UAV may then compute a new path based on adding the given item to the cargo and determine whether the changes to the path as a result of adding the given item will decrease the current total range computed for the already obtained cargo by an amount that exceeds a threshold. If changes to the path will not reduce the range by more than the threshold, the local UAV may obtain and add the new item to the cargo and generate the new path for delivering all of the items including the newly obtained item.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. For example, the software architecture may be implemented by any combination of the local UAV 109, the distance UAV 105, and/or the UAV server 107 to deliver an item, included in a package of items, using multiple UAVs to a delivery destination. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules. The libraries 820 may allow the UAV server 107 to communicate with the local UAV 109 and/or the distance UAV 105 to perform the operations discussed above.

The frameworks/middleware 818 (also sometimes referred to as middleware) provide a higher-level common infrastructure that may be used by the applications 816 and/or other software components/modules. For example, the frameworks/middleware 818 may provide various graphic user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
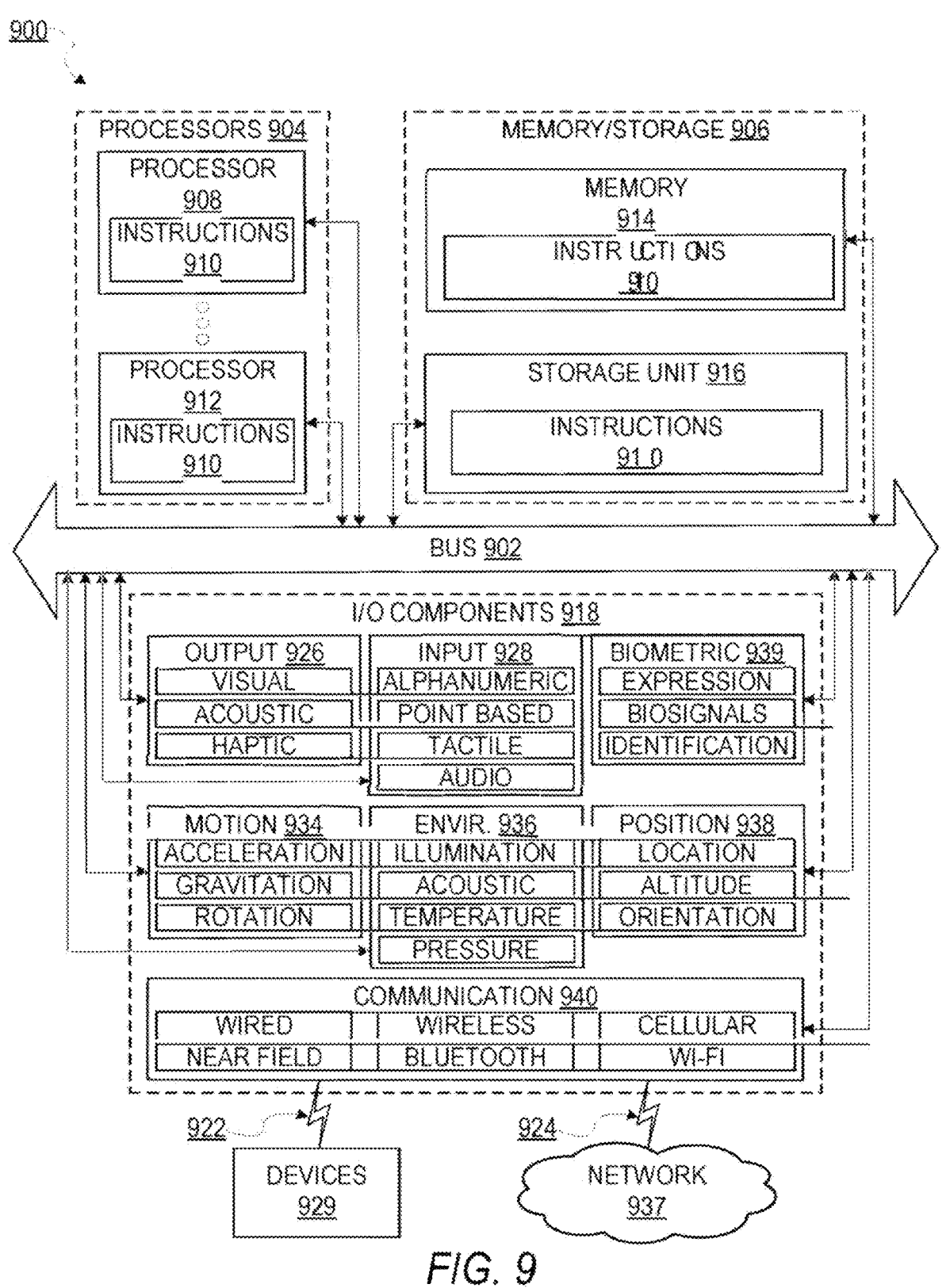
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. The machine 900 may be implemented in whole or in party by any one or combination of the local UAV 109, the distance UAV 105, and/or the UAV server 107 to deliver an item in a package of items to a delivery destination using multiple UAVs. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 929 may be another machine or any of a wide variety of peripheral devices (e.g., a peripheral device coupled via a USB).

Moreover, the communication components 940 may detect identifiers or include components operable to detect identifiers (e.g., in items in a package or a package among multiple packages). The communication components 940 may be included in each respective local UAV 109 and distance UAV 105. For example, the communication components 940 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

Figure 10:
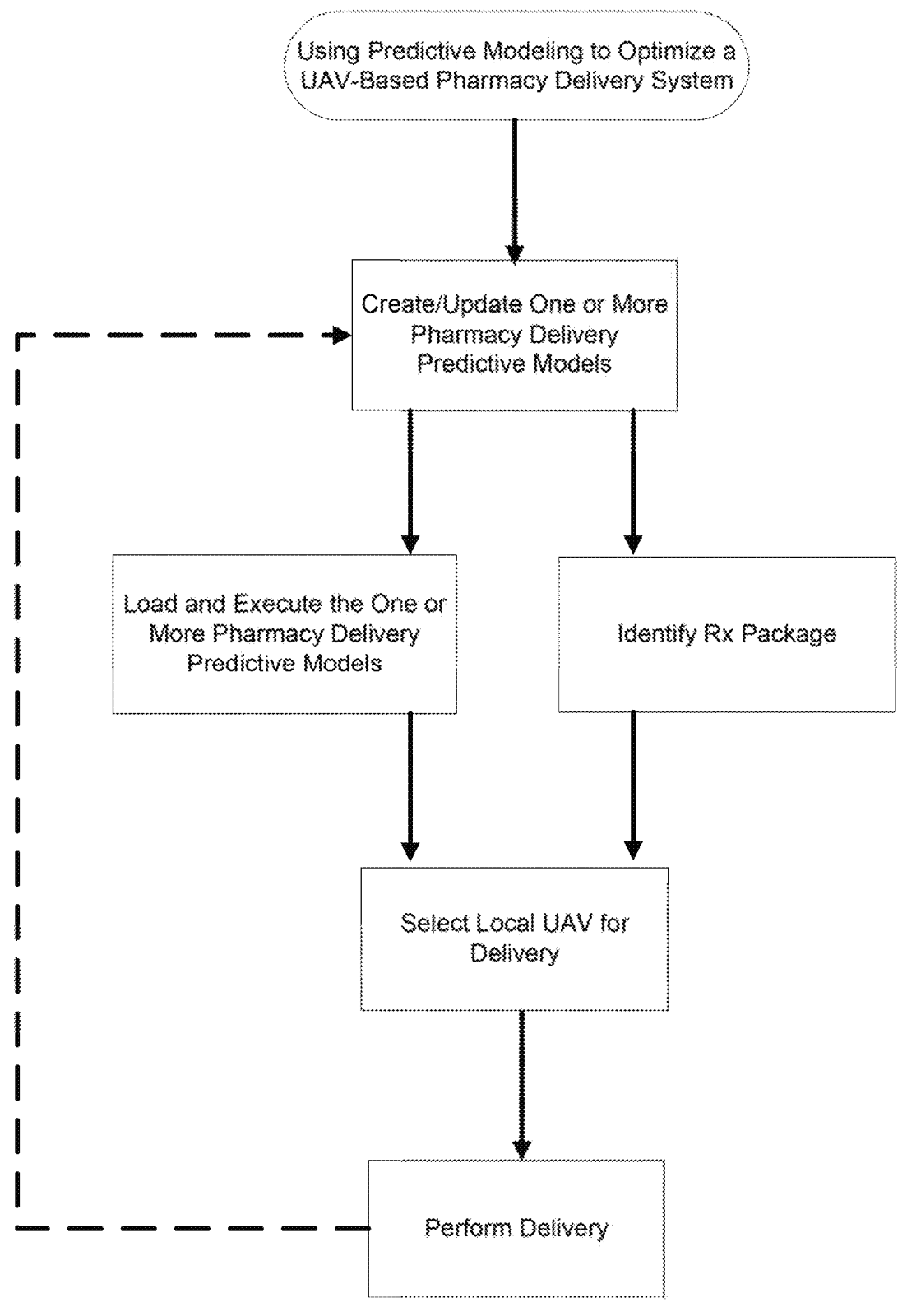
FIG. 10 is an additional flowchart illustrating example operations of the UAV server, according to example embodiments.

FIG. 10 is a flow chart that illustrates an embodiment of a process 1000 for using predictive modeling to optimize a UAV-based pharmacy delivery system. The various tasks performed in connection with process 1000 may be performed by software, hardware, firmware, or any combination thereof. For illustrative purposes, the following description of process 1000 may refer to elements mentioned herein, in connection with FIGS. 1-5, 8-9, and/or 11-15. In practice, portions of process 1000 may be performed by different elements of the described system. It should be appreciated that process 1000 may include any number of additional or alternative tasks, the tasks shown in FIG. 10 need not be performed in the illustrated order, and process 1000 may be incorporated into a more comprehensive procedure or process having additional functionality not described in detail herein. Moreover, one or more of the tasks shown in FIG. 10 could be omitted from an embodiment of the process 1000 as long as the intended overall functionality remains intact.

For ease of description and clarity, description of the process 1000 begins where the process 1000 develops one or more pharmacy delivery predictive models (step 1002). Here, the process 1000 creates one or more predictive models that do not previously exist, or the process 1000 updates currently existing predictive models using updated information.

Figure 11:
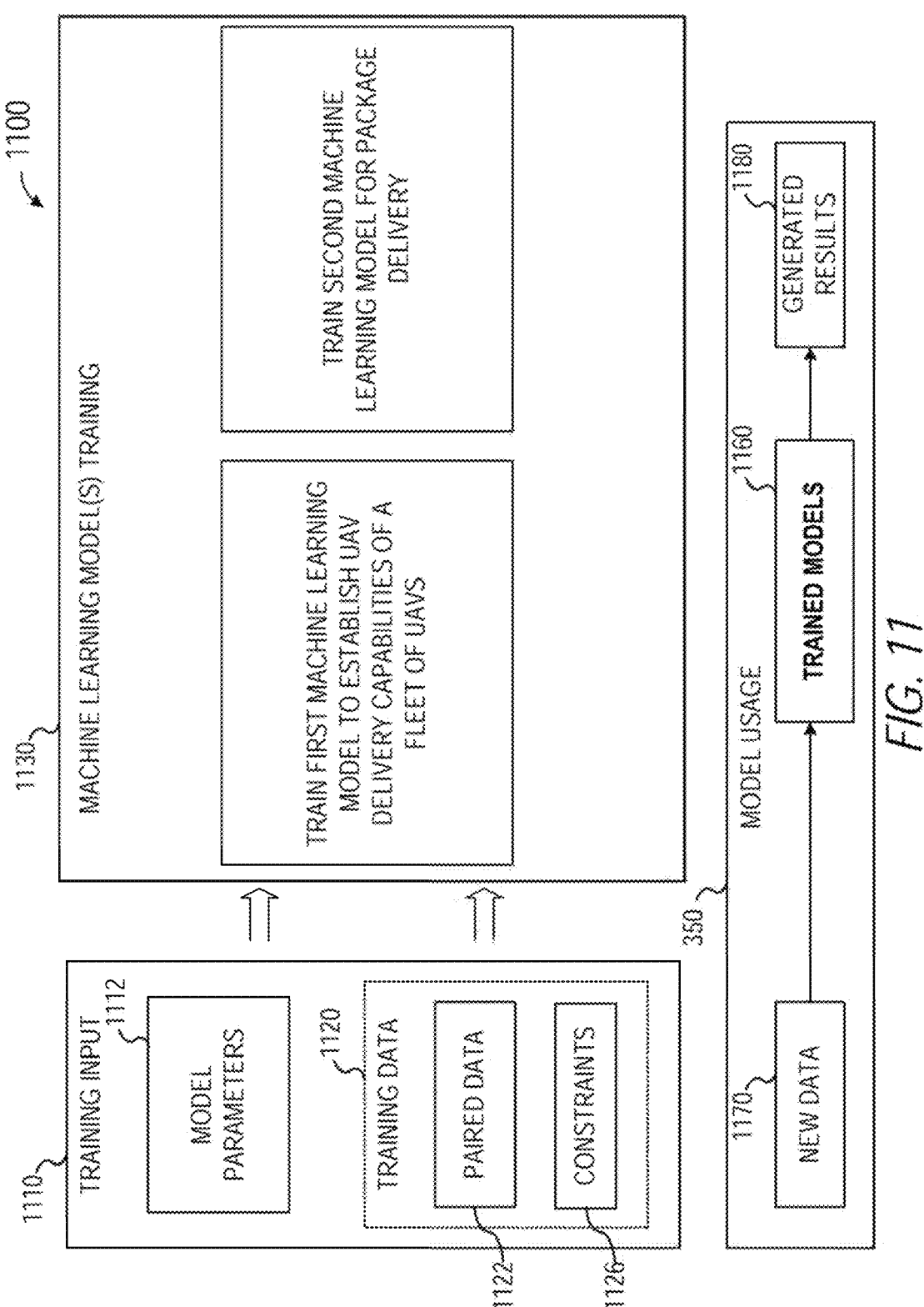
FIG. 11 is a block diagram of an example UAV modeling platform that may be deployed within the system of FIG. 1, according to some embodiments.
Figure 12:
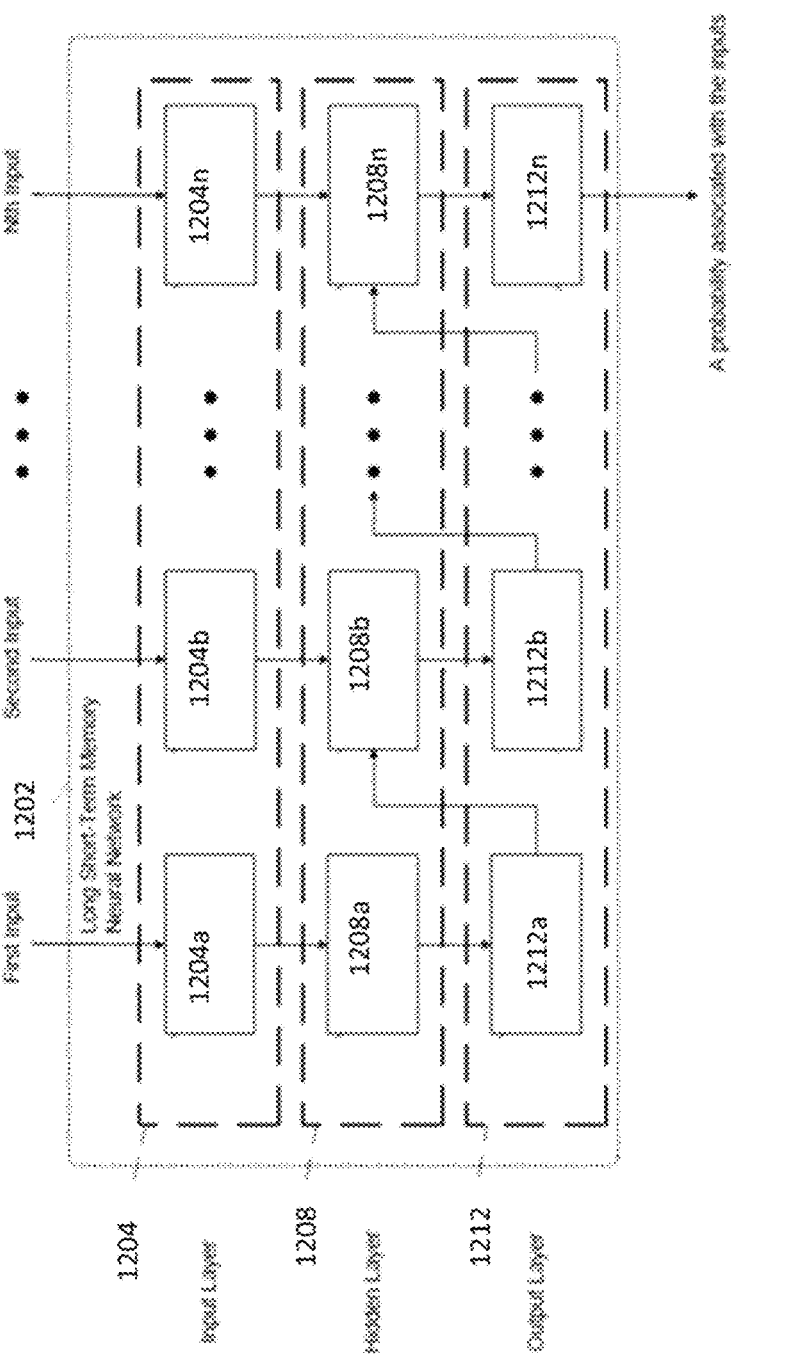
FIG. 12 is a functional block diagram of an example neural network that can be used for the UAV modeling platform, as described herein to produce a predictive model.

Exemplary embodiments of applicable predictive models may be found in FIGS. 11 and 12. However, it should be appreciated the predictive model examples shown in FIGS. 11-12 may be used alone or in combination with other predictive modeling frameworks, for purposes of identifying local UAV types and/or specific local UAVs to complete deliveries under a given set of conditions.

Input data sets may include, but are not limited to: historical data associated with the regional hub, the particular local UAVs residing at the regional hub, the types of local UAVs residing at the regional hub, and historical delivery performance associated with a particular prescription drug item and the particular local UAV types residing at the regional hub. Input data sets may also include, but are not limited to: historical and current weather conditions data (e.g., temperature data, wind speed data, precipitation data, humidity data) along the flight path to the target delivery destination; delivery site conditions, or the like. Input data sets may also include, but are not limited to: drug data associated with particular prescription medications and similar drugs associated with equivalent or comparable clinical results, including environmental requirements to maintain physical integrity and chemical effectiveness of each similar medication (e.g., maximum tolerable temperature, minimum tolerable temperature, maximum humidity level, minimum humidity level). Additionally, input data sets may include packaging data for a particular prescription drug item, including historical packaging options used, delivery failure and success data associated with particular packaging options, alone or in combination with other input data set factors, such as UAV type, environmental conditions, weather conditions, and the like.

The input data sets can also include geographic areas in which UAV operations are allowed, such parameters can include geographic areas, vertical limits, airspace restrictions. Additional parameters for input data sets can include days of week and times of day. The input data sets can further include the conditions required for UAV flight. These parameters may further be dependent on the load a package may place on a UAV and the time it would take for a UAV to deliver the package. The models can also take into account flight paths to avoid restricted air space. In an example, the present systems and methods can receive a fixed map of airspace restrictions from the Federal Aviation Administration and input those into the models. The presently systems and methods can further receive data relating to Temporary Flight Restrictions (TFR) and refine UAV delivery options based on such flight restrictions.

Deliveries are made using specific resources to accommodate the route or path to the target delivery destination and back to the regional hub; current weather conditions; weight of the regional payload; conditions required by the regional payload (e.g., temperature, humidity); currently level of battery power of local UAVs; and local UAV types available at the regional hub. A local UAV "type" may indicate a larger battery capacity that enables a particular local UAV to travel longer distances and/or withstand traveling during heavy winds. Another example of a local UAV type may indicate variations in rotors that enable a particular local UAV to realize more lift than other UAVs.

Here, the predictive models use sets of input data to identify optimal resources to complete deliveries of prescription medications and/or medical products from a pharmacy. Optimal resources include particular local UAVs and/or types of local UAVs having capabilities suited to delivering a particular regional payload to a particular target delivery destination, and completing a return trip back to the regional hub.

After creating or updating the one or more pharmacy delivery predictive models (step 1002), the process 1000 then loads and executes the one or more pharmacy delivery predictive models (step 1004). Pharmacy delivery predictive models provide output to assist pharmacy personnel and/or an automated pharmacy system (e.g., a pharmacy UAV server) in selecting or designating a "best option" local UAV of the plurality of local UAVs at the regional hub. In this scenario, the optimal local UAV is determined by the predictive model to be most capable of delivering the regional payload (consisting of the one prescription medication) to the target delivery destination, based on the input data sets described previously with regard to step 1002.

Predictive model output data may include an indication of an optimal local UAV for performing a current delivery based on one particular condition included in the input data sets, based on a subset of the conditions included in the input data sets, and/or based on all known conditions included in the input data sets.

Predictive model output data may also include a determination of whether a specific local UAV is capable of delivering a particular regional payload to the target delivery destination. In this scenario, the process 1000 does not seek a "best" or "optimal" UAV to perform the delivery. Instead, the process 1000 determines whether one of the local UAVs that are available at the regional hub are capable of delivering the regional payload. Additionally or alternatively, the process 1000 may determine whether a subset or all of the UAVs are capable of delivering the regional payload to the target delivery destination.

Alternatively or in combination with one or more of the previously described options, the predictive model output data may include a ranked list of the local UAVs residing at the regional hub, based on the input data set parameters. Here, the predictive model provides an assessment of the suitability of each of the local UAVs to be a "best option" for delivering the regional payload to the target delivery destination.

The process 1000 also identifies the applicable prescription medication package (step 1006). The prescription medication package includes one or more of filled containers, e.g., holding a 30, 60, 90-day pill supply (or other solid medication, a unit-of-use medication, liquid containing bottle, plus associated literature. In the case of temperature-controlled contents in the prescription medication package, ice packs or gel packs can be in the prescription medication package. Different medication packages can be thermoformed polymer bags, paper bags, or corrugated boxes or the like. The prescription medication package can have an effect on the ability of either the distance UAV or the local UAV to deliver the prescription to the delivery location.

During typical operation, a distance UAV has delivered a distance payload to a regional hub (i.e., a base station where a plurality of local UAVs reside). The distance payload includes a plurality of regional payloads, wherein each of the regional payloads consists of one prescription medication associated with one target delivery destination (e.g., a patient's home).

Here, the process 1000 selects one of the regional payloads (i.e., one prescription medication package) for regional delivery by a local UAV departing from the regional hub, carrying the regional payload to the target delivery destination, releasing the regional payload at a delivery site within a boundary or perimeter of the target delivery destination, and returning to the regional hub. The regional payload may be selected from the plurality of regional payloads based on one or more criteria, including but not limited to: temperature requirements of the medication; environmental requirements of the medication; available packaging for the medication, including protections from temperature and other environmental conditions; current availability of local UAVs or types of local UAVs at the regional hub; and the capability or non-capability of available local UAVs to carry and transport particular types of medications while meeting the required temperature and environmental criteria for that particular medication.

Determining whether a local UAV can deliver the regional payload depends upon at least one of: (i) the capabilities of the local UAVs, and (ii) characteristics of the prescription medication included in the regional payload. These characteristics include vulnerabilities to particular temperature thresholds (e.g., maximum or minimum temperature tolerances), or particular environmental conditions (e.g., maximum or minimum humidity tolerances, precipitation tolerances, visibility tolerances, wind speed tolerances), or the like. The pharmacy delivery predictive models also determine, based on the input data sets, which prescription drugs can be delivered and which prescription drugs cannot be delivered due to temperature control requirements and/or environmental control requirements unable to be met using available packaging options in combination with the currently available types of local UAVs.

When a particular prescription drug (i.e., a first prescription drug) cannot be delivered due to a lack of adequate temperature controls and/or environmental controls for use with the currently available UAV types, the process 1000 also uses the predictive model to identify potential alternative prescription drugs that are similar to the first prescription drug, wherein a potential alternative prescription drug may have increased tolerances for temperature and/or environmental conditions, and therefore, the potential alternative prescription drug may be a preferable option for home-delivery.

Identification of the applicable prescription medication package includes: (i) selecting an appropriate regional payload to deliver, and (ii) physically locating that selected regional payload for retrieval and delivery. The regional payload may be physically located using an identifier, such as machine-readable code, a QR code, and RFID tag, or the like. For example, each regional payload may include a tag that may be scanned to identify contents of the regional payload, including the prescription medication.

The applicable prescription medication package may be selected when a local UAV receives prescription medication data from a UAV server adapted to communicate with the local UAVs to provide at least a set of instructions for obtaining and delivering a regional payload that includes a prescription drug.

An RFID tag can be associated with the prescription medication. The RFID can be in the prescription medication package. A RFID reader at either the pharmacy or the regional hub can read the RFID to identify the prescription medication package. A UAV server may receive the RFID data, e.g., an identification code. Using the RFID data the UAV server receives data from a remote server, e.g., the pharmacy server or other server. In this example, the UAV server receives the predictive modeling data, identifies which local UAVs are capable of delivering the regional payload, and assigns one of the capable local UAVs and/or an optimal one of the capable local UAVs to deliver the regional payload, using the medication package data and the models (see select local UAV 1008). The present description uses the term of RFID to identify a type of touch-free data exchange for ease of description. In other embodiments other machine readable elements can be used in place of RFID to perform the same function of identifying the prescription medication package.

In an example embodiment, the local UAV itself can nominate itself or calculate that it can deliver a certain prescription medication package. The local UAV receives package parameters and predictive modeling data indicating that it is or is not capable of delivering the regional payload, e.g., a payload that has certain parameters. If capable, the local UAV obtains the regional payload and performs the delivery. If not capable, a second local UAV receives predictive modeling data indicating that self is capable of delivering the regional payload.

Based on the predictive model (step 1004) and applicable characteristics of the identified prescription medication package (step 1006), the process 1000 selects one of a plurality of local UAVs to complete the delivery (step 1008).

Evaluation of prescription medication data and predictive modeling data may be performed by a UAV server or a local UAV using onboard computing resources. In the first scenario, a UAV server obtains or retrieves, prescription medication data and predictive modeling data, determines an appropriate prescription medication for delivery (and associated regional payload), and transmits information identifying the regional payload to a local UAV (selected in step 1008).

In a first example embodiment, a UAV server may retain identifying information for each regional payload included in the distance payload transported to the regional hub. In this scenario, the UAV server may transmit identifying information to a local UAV (selected in step 1008) to retrieve the particular regional payload identified by the UAV server using prescription medication data and predictive modeling data. The local UAV receives the identifying information from the UAV server, travels to the area of the regional hub where the distance payload is located, and identifies the particular regional payload using a scanner, (e.g., RFID scanner, QR code scanner, machine-readable code scanner).

In a second example embodiment, the appropriate regional payload to be delivered may be determined by the local UAV itself, instead of receiving this information from the UAV server. In this scenario, the local UAV may receive predictive modeling data indicating that the local UAV itself is or is not capable of delivering the regional payload, based on the capabilities of the local UAV and the required temperature and environmental conditions for the particular medication. If the predictive modeling data indicates that the local UAV is capable of delivering the particular medication, then the local UAV obtains the regional payload and performs the delivery. If the predictive modeling indicates that the local UAV is not capable of delivering the particular medication, then a second local UAV receives predictive modeling data indicating that the second local UAV is capable of delivering the regional payload.

After selecting the appropriate local UAV to complete the delivery (step 1008), the process 1000 then performs the delivery (step 1010). Performing the delivery includes traveling the flight path to the target delivery destination carrying the regional payload, performing lateral movement and hover operations to access a delivery site, releasing the regional payload at the delivery site, and completing the round-trip by returning to the regional hub. Delivery sites may include at least one of: a porch, a balcony, a garage, an above-ground apartment landing, and/or any type of delivery receptacle or surface that a local UAV can access, at the target delivery destination, to release the regional payload for delivery to the patient.

FIG. 11 is a block diagram of an example UAV modeling platform 1100 that may be deployed within the system of FIG. 1, according to some embodiments. Training input 1110 includes model parameters 1112 and training data 1120 (e.g., training data 220 (FIG. 2)) which may include paired training data sets 1122 (e.g., input-output training pairs) and constraints 1126. Model parameters 1112 stores or provides the parameters or coefficients of corresponding ones of machine learning models. During training, these parameters 1112 are adapted based on the input-output training pairs of the training data sets 1122. After the parameters 1112 are adapted (after training), the parameters are used by trained models 1160 to implement the trained machine learning models on a new set of data 1170.

Training data 1120 includes constraints 1126 which may define the constraints of given UAV features or package features. The paired training data sets 1122 may include sets of input-output pairs, such as pairs of a plurality of UAV features and delivery features. The paired training data sets 1122 may include sets of input-output pairs, such as pairs of a prescription package features and features of local UAV. Some components of training input 1110 may be stored separately at a different off-site facility or facilities than other components.

Machine learning model(s) training 1130 trains one or more machine learning techniques based on the sets of input-output pairs of paired training data sets 1122. For example, the model training 1130 may train the machine learning (ML) model parameters 1112 by minimizing a loss function based on one or more ground-truth data.

The ML models can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, and the like.

Particularly, a first ML model of the ML models can be applied to a training batch of UAV delivery features to estimate or generate a prediction of UAV delivery performance, e.g., when delivering prescription packages. In some implementations, a derivative of a loss function is computed based on a comparison of the estimated UAV delivery performance and the ground truth entities of the UAV delivery performance and parameters of the first ML model are updated based on the computed derivative of the loss function. The result of minimizing the loss function for multiple sets of training data trains, adapts, or optimizes the model parameters 1112 of the corresponding first ML model. In this way, the first ML model is trained to establish a relationship between a plurality of training UAV deliveries, which can include prescription deliveries, and ground-truth entities of UAV deliveries.

A second ML model of the ML models can be applied to a training batch of prescription packages to estimate or generate a prediction of the delivery characteristics prescription package. In some implementations, a derivative of a loss function is computed based on a comparison of the estimated prescription package delivery effects and the ground truth prescription package delivery effects and parameters of the second ML model are updated based on the computed derivative of the loss function. The result of minimizing the loss function for multiple sets of training data trains, adapts, or optimizes the model parameters 1112 of the corresponding second ML model. In this way, the second ML model is trained to establish a relationship between a plurality of training prescription packages and ground-truth prescription packages.

After the machine learning models are trained, new data 1170, including one or more prescription package features and UAV delivery features are received and/or derived from a document being accessed by the patient management platform 150. The first trained machine learning model may be applied to the new data 1170 to generate results 1180 including a prediction of one or more entities. The one or more entities are applied to the second trained machine learning model to generate a prediction of a UAV delivery of delivery performance of the package (e.g., flight characteristics). The predicted UAV delivery and/or the package delivery performance can be represented in a GUI, such as in a prompt overlaid on the GUI that depicts the delivery of a prescription package along with a confidence score and indication of whether the delivery meets delivery requirements or constraints. Delivery constraints can be related to temperature control, delivery prior to a patient running out of medication, time constraints, performance requirements, delivery time windows, or the like.

The presently described predictive model system and methods can be used to predict what prescriptions can be delivered by UAV. The servers can produce a model that allows certain prescriptions to be allowed for UAV delivery. In an example, the system can inform the patient, care giver or provider that a prescription is eligible for UAV delivery, e.g., to the device associated with one or all of the patient, care giver or provider.

An additional input into the modeling system is whether an autonomous UAV can delivery the package or whether the package must be delivered by a drone, i.e., a UAV that is piloted remotely by a person. Thus, the allowance of UAV delivery by a drone would require knowledge if a pilot was available to assist in flying the UAV. In an example, the pilot could also conform delivery of high value or restricted drugs.

A further input into the models is flight restrictions. The present models can predict flight restrictions based on past flight restrictions and the models can adjust prescription package delivery confidence scores accordingly, or not allow a local UAV to even attempt delivery and switch a prescription package from UAV delivery to ground delivery at the regional hub.

FIG. 12 is a functional block diagram of an example neural network 1202 that can be used for the UAV modeling platform, as described herein to produce a predictive model. The predictive model can identify an appropriate local UAV for delivering a regional payload under current conditions, and/or identify whether a particular drug can be delivered using the currently available local UAVs under current temperature and/or weather conditions. In an example, the neural network 1202 can be a LSTM neural network. In an example, the neural network 1202 can be a recurrent neural network (RNN). The example neural network 1202 may be used to implement the machine learning as described herein, and various implementations may use other types of machine learning networks. The neural network 1202 includes an input layer 1204, a hidden layer 1208, and an output layer 1212. The input layer 1204 includes inputs 1204*a*, 1204*b* . . . 1204*n*. The hidden layer 1208 includes neurons 1208*a*, 1208*b* . . . 1208*n*. The output layer 1212 includes outputs 1212*a*, 1212*b* . . . 1212*n*.

Each neuron of the hidden layer 1208 receives an input from the input layer 1204 and outputs a value to the corresponding output in the output layer 1212. For example, the neuron 1208*a* receives an input from the input 1204*a* and outputs a value to the output 1212*a*. Each neuron, other than the neuron 1208*a*, also receives an output of a previous neuron as an input. For example, the neuron 1208*b* receives inputs from the input 1204*b* and the output 1212*a*. In this way the output of each neuron is fed forward to the next neuron in the hidden layer 1208. The last output 1212*n* in the output layer 1212 outputs a probability associated with the inputs 1204*a*-1204*n*. Although the input layer 1204, the hidden layer 1208, and the output layer 1212 are depicted as each including three elements, each layer may contain any number of elements. Neurons can include one or more adjustable parameters, weights, rules, criteria, or the like.

In various implementations, each layer of the neural network 1202 must include the same number of elements as each of the other layers of the neural network 1202. For example, training features (e.g., collection of UAV delivery parameters associated with a first set of ground truth UAV deliveries and/or prescription packaging corresponding to prescriptions fulfilled associated with a first set of ground truth aerial delivered packages) may be processed to create the inputs 1204*a*-1204*n*.

The neural network 1202 may implement a first model to determine an appropriate local UAV to deliver a regional payload. More specifically, the inputs 1204*a*-1204*n* can include one or more of the following current weather conditions (e.g., temperature, precipitation, wind, sunlight, snow, and the like), available battery life of each of the local UAVs, charging rate of the local UAV, weight of the regional payload (e.g., the prescription package), and performance parameters of each of the local UAVs, which may include but are not limited to: distance capabilities, operating capabilities in particular weather conditions, battery capacity, remaining battery charge, any reduction in efficiency at temperatures above and/or below a particular temperature threshold.

The neural network 1202 may implement a first model to produce one or more UAV delivery performance predictions. More specifically, the inputs 1204*a*-1204*n* can include fields of the prescription or prescription package as data features (binary, vectors, factors or the like) stored in the storage device 110. The features of the prescription can be provided to neurons 1208*a*-1208*n* for analysis and connections between the known facts. The neurons 1208*a*-1208*n*, upon finding connections, provides the potential connections as outputs to the output layer 1212, which determines a set of entities associated with the prescription.

The neural network 1202 may implement a second model to produce one or prescription package delivery models. More specifically, the inputs 1204*a*-1204*n* can include entities determined by the first model as data features (binary, vectors, factors or the like) stored in the storage device 110 and features related directly to the package itself with a certain prescription therein. The features of the entities can be provided to neurons 1208*a*-1208*n* for analysis and connections between the known facts. The neurons 1208*a*-1208*n*, upon finding connections, provides the potential connections as outputs to the output layer 1212, which determines a delivery model associated with a type of UAV or a model associated with delivery of a type of prescription package.

The neural network 1202 can perform any of the above calculations. The output of the neural network 1202 can be used to trigger display of a prompt on a user device that includes the UAV(s) that can deliver a particular package to an operator of a GUI. The operator device can provide an approval electronic notification to the electronic records in the server that the selected UAV or UAV type is selected for delivery. Additionally, the notification can be provided to a PBM, health plan manager, pharmacy, physician, caregiver, and/or a patient. The notification can include data from the original prescription received from the healthcare professional, a confidence level associated with the UAV delivery, and/or an option to accept or revise the delivery using the UAV. If accepted by selecting the option to accept, the UAV aerial delivery is performed.

In some examples, a convolutional neural network may be implemented. Similar to neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 1204*a* is connected to each of neurons 1208*a*, 1208*b* . . . 1208*n*.

The UAV predictive models can further address the issues dealing with a plurality of packages with their constraints and a fleet of a plurality of UAVs available to deliver the packages. The predictive models can efficiently organize the delivery times for a fleet of UAVs, ensuring that packages are delivered to the respective delivery locations on time. The model can assign UAVs to multiple deliveries and recharging times with fixed start and finish times. The UAV flight range, weight capacity, and other specifications of UAVs vary depending on the UAV make and model. In some examples, UAVs have a flight range of around 3-5 km (1.8-3.1 miles) and a weight capacity of up to 2-5 kg (4.4-11 pounds). Some UAVs have a flight range up to 10 km (6.2 miles) or more, and a weight capacity of up to 10-20 kg (22-44 pounds). The servers can apply the models to UAV delivery operations, delivery decisions must be made regarding the delivery assignment, drone recharging, and maintenance to provide reliable operations based on the UAV's operating parameters. The servers and models can apply to multiple types of UAVs that are homogeneous or heterogeneous in types.

Figure 13:
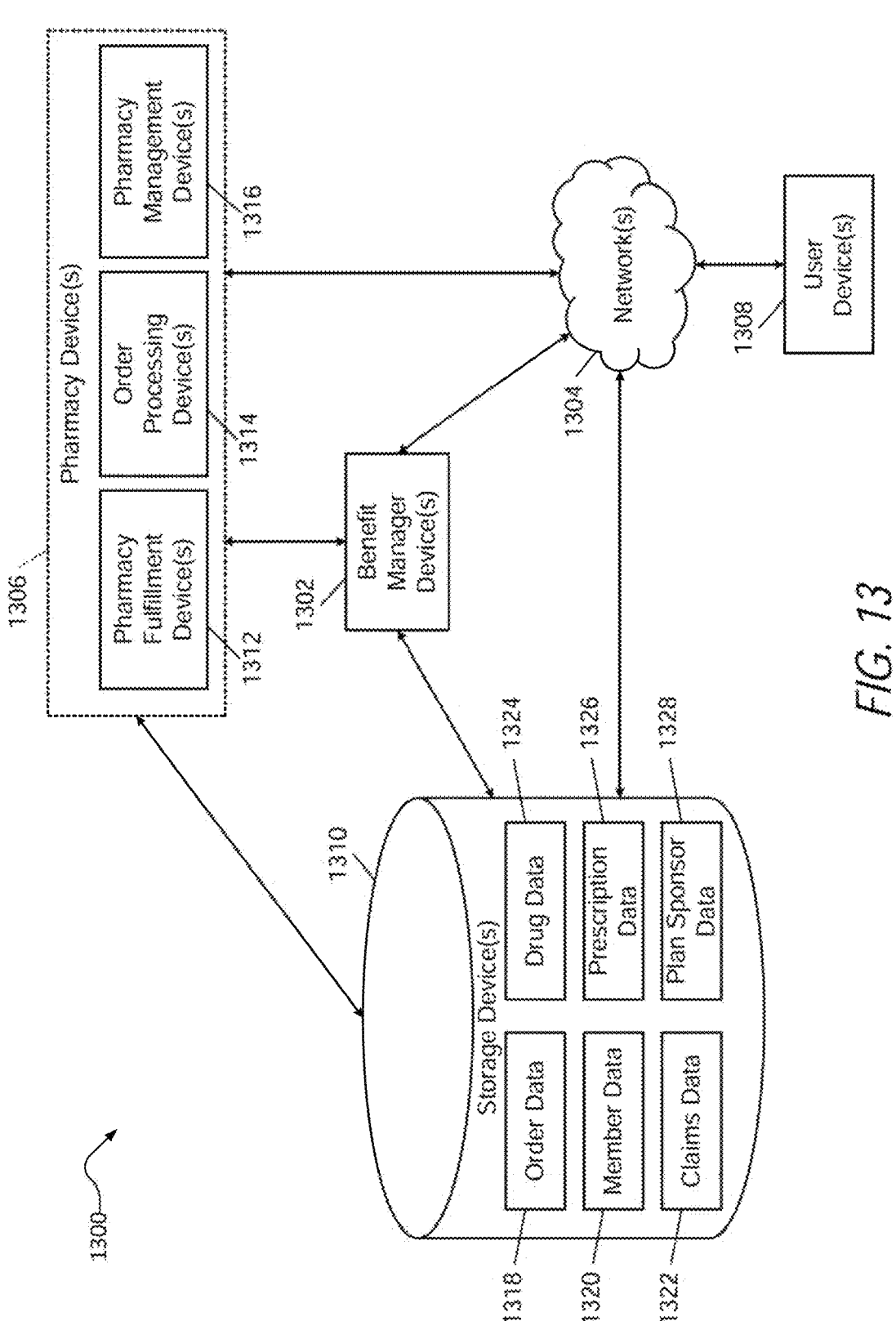
FIG. 13 is a block diagram of a high-volume pharmacy system, according to an example embodiment.

FIG. 13 is a block diagram of a high-volume pharmacy system, according to an example embodiment. It should be appreciated that high-volume pharmacy system 1300 may be one implementation of pharmacy 202 described with regard to FIG. 2. While the system 1300 is generally described as being deployed in a high-volume pharmacy or fulfillment center (e.g., a mail order pharmacy, a direct delivery pharmacy, an automated pharmacy, multiple package delivering center, and the like), the system 1300 and/or components thereof may otherwise be deployed (e.g., in a lower volume pharmacy). A high-volume pharmacy may be a pharmacy that is capable of filling prescriptions automatically, mechanically, manually, or a combination thereof. The system 1300 may include a benefit manager device 1302, a pharmacy device 1306, and a user device 1308, which may communicate with each other directly and/or over a network 1304. The system may also include a storage device 1310.

The benefit manager 1302 is a device operated by an entity that is at least partially responsible for creation and/or management of the pharmacy or drug benefit. While such an entity operating the benefit manager device 1302 is typically a pharmacy benefit manager (PBM), other entities may operate the benefit manager device 1302 either on behalf of themselves, the PBM, another entity, or other entities. For example, the benefit manager device 1302 may be operated by a health plan, a retail pharmacy chain, a drug wholesaler, a data analytics or other type of software related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmaceutical vending machines or kiosks, and the like.

Some of the operations of the PBM that operates the benefit manager device 1302 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery from a mail order pharmacy location, which may be the high-volume pharmacy system 1300. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, by the high-volume pharmacy system 1300.

The member may have a copayment for the prescription drug that reflects an amount of money that the member is responsible to pay the pharmacy for the prescription drug. The money paid by the member to the pharmacy may come from personal funds of the member, a health savings account (HSA) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 1310 or determined by the benefit manager device 1302.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim. No copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 1302) may perform certain adjudication operations including verifying eligibility of the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 1302 to the pharmacy device 1306) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 1304 include Mobile Communications (GSM) network, a code division multiple access (CDMA) network, 3rd Generation Partnership Project (3GPP), an Internet Protocol (IP) network, a Wireless Application Protocol (WAP) network, a Wi-Fi network, or an IEEE 802.11 standards network, as well as various combinations thereof. The network 104 may include an optical network. The network 104 may be a local area network or a global communication network, such as the Internet. In some embodiments, the network 1304 may include a network dedicated to prescription e-orders, e.g., a prescribing network such as the electronic prescribing network operated by Surescripts of Arlington, Virginia.

Moreover, although the system shows a single network 1304, multiple networks can be used. The multiple networks may communicate in series with each other to link the devices 1302, 1306-1310 or in parallel to link the devices 1302, 1306-1310.

The pharmacy device 1306 may include an order processing device 1314, a pharmacy manager device 1316, and a pharmacy fulfillment device 1312 in communication with each other directly and/or over the network 1304.

The order processing device 1314 may receive information regarding filling prescriptions and may direct an order component to one or more than one of the devices of the pharmacy fulfillment device 1312 at a pharmacy. The pharmacy fulfillment device 1312 may fulfill, dispense, aggregate, and/or pack the order components of the prescription drugs in accordance with one or more than one of the prescription orders directed by the order processing device 1314. The order processing device 1314 may be deployed in the system 1300, or may otherwise be used.

In general, the order processing device 1314 is a device located within or otherwise associated with the pharmacy to enable fulfillment of a prescription and dispensing prescription drugs by the pharmacy fulfilment device 1312. In some embodiments, the order processing device 1314 may be an external device separate from the pharmacy and communicate with other devices located within the pharmacy.

For example, the external order processing device 1314 may communicate with an internal order processing device 1314 and/or other devices located within the system 1300. In some embodiments, the external order processing device 1314 may have limited functionality (e.g., as operated by a patient requesting fulfillment of a prescription drug), while the internal pharmacy order processing device 1314 may have greater functionality (e.g., as operated by a pharmacist).

The order processing device 1314 may track the prescription order as it is fulfilled by the pharmacy fulfillment device 1312. The prescription order may include one or more than one prescription drugs to be filled by the pharmacy. The order processing device 1314 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 1314 may also track and/or schedule literature or paperwork associated with each prescription order or multiple prescription orders that are being shipped together.

The pharmacy management device 1316 may enable and/or facilitate management and operations in a pharmacy. For example, the pharmacy management device 1316 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 1314 may operate in combination with the pharmacy management device 1316.

In some embodiments, the pharmacy management device 1316 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 1316 may be utilized by the pharmacy to submit the claim to the PBM (e.g., through the benefit management device 1302) for adjudication.

In some embodiments, the pharmacy management device 1316 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 1302 may track prescription drug fulfillment and/or other information for patients that are not members or have not identified themselves as members, at the time (or in conjunction with the time) in which they seek to have a prescription filled at a pharmacy.

The pharmacy fulfillment devices 1312, the order processing device, and/or the pharmacy management device 1316 may include circuitry, a processor, a memory to store data and instructions, and communication functionality. These devices 1312-1316, in some embodiments are dedicated to performing processes, methods and/or instructions described herein. Other types of electronic devices specifically configured to implement with the processes, methods and/or instructions described herein may also be used.

In some embodiments, at least some functionality of the order processing device 1314 may be included in the pharmacy management device 1316 may include circuitry, a processor, a memory to store data and instructions, and communication functionality. These devices 1312-1316, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 1314 may be included in the pharmacy management device 1316. The order processing device 1314 may be in a client-server relationship with the pharmacy management device 1316, in a peer-to-peer relationship with the pharmacy management device 1316, or in a different type of relationship with the pharmacy management device 1316. The order processing device 1314 and/or the pharmacy management device 1316 may communicate directly (e.g., by utilizing a local storage) and/or through the network 1304 (e.g., by utilizing a cloud configuration or software as a service, etc.) with the storage 1310.

The user device 1308 is used by a device operator. The device operator may be a user (e.g., an employee, a contractor, a benefit member, a patient of the pharmacy, or the like) associated with the system 1300. Other device operators may also operate the user device 1308. In some embodiments, the user device 1308 may enable the device operator to attend to pharmacy operations in a convenient manner (e.g., remote from a pharmacy). In some embodiments, the user device 1308 may enable the device operator to receive information about pharmacy processes, prescription drug fulfillment status, and the like.

The user device 1308 may be a stand-alone device that solely provides at least some of the functionality of the methods and systems, or may be a multi-use device that has functionality outside off analysis of the methods and systems. Examples of the user device 1308 include a set-top box (STB), a receiver card, a mobile telephone, a personal digital assistant (PDA), a display device, a portable gaming unit, a computing system, and the like. Other devices, however, may also be used. In some embodiments, the computing system may include a mobile computing device. For example, the user device 1308 may include a mobile electronic device, such as an iPhone or iPad by Apple, Inc., and mobile electronic devices powered by Android by Google, Inc. The user device 1308 may also include other computing devices, such as desktop computing devices, notebook computing devices, netbook computing devices, gaming devices, and the like. Other types of electronic devices may also be used.

The storage device 1310 may include: a non-transitory storage (e.g., memory, hard disk, CD-ROM, and the like) in communication with the benefit manager device 1302, the pharmacy device 1306, and/or the user device 1308 directly and/or over the network 1304. The non-transitory storage may store order data 1318, member 1320, claims data 1322, drug data 1324, prescription data 1326, and/or plan sponsor 1328. Further, the system 1300 may include additional devices, which may communicate with each other directly or over the network 1304.

The order data 1318 may be related to a prescription order. The order data may include the type of the prescription drug (e.g., drug name and strength) and quantity of the prescription drug. The order data 1318 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 1318 may be used by the pharmacy to fulfill a pharmacy order.

In some embodiments, the order data 1318 includes verification information associated with fulfillment of the prescription in the pharmacy. For example, the order data 1318 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 1318.

The member data 1320 includes information regarding the members associated with the PBM. The information stored as member data 1320 may include personal information, personal health information, protected health information, fitness data, health data, web and mobile app activity, and the like. Examples of the member data 1320 include name, address, telephone number, e-mail address, prescription drug history, and the like. The member data 1320 may include a plan sponsor identifier that identifies the plan sponsor associated with the member and/or a member identifier that identifies the member to the plan sponsor. The member data 1320 may also include, by way of example, dispensation preferences such as type of label, type of cap, message preferences, language preferences, or the like.

The member data 1320 may be accessed by various devices in the pharmacy to obtain information utilized for fulfillment and shipping of prescription orders. In some embodiments, an external order processing device 1314 operated by or on behalf of a member may have access to at least a portion of the member data 1320 for review, verification, or other purposes.

In some embodiments, the member data 1320 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 1322 includes information regarding pharmacy claims adjusted by the PBM under a drug benefit program provided by the PBM for one, or more than one, plan sponsor. In general, the claims data 1322 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 1322. For example, medical claims, dental claims, wellness claims, or other types of health care-related claims for members may be stored as a portion of the claims data.

In some embodiments, the claims data 1322 includes claims that identify the members with whom the claims are associated. In some embodiments, the claims data 1322 includes claims that have been de-identified (e.g., associated with a unique identifier but not with a particular, identifiable member), aggregated, and/or otherwise processed.

The drug data 1324 may include drug name (e.g., technical name and/or common name), other names by which the drug is known by, active ingredients, an image of the drug (e.g., in pill form), and the like. The drug data 1324 may include information associated with a single medication or multiple medications.

The prescription data 1326 may include information regarding prescriptions that may be issued by prescribers on behalf of patients, who may be members of the pharmacy benefit plan, for example to be filled by a pharmacy. Examples of the prescription data 1326 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 1318 may be linked to associated member data 1320, claims data 1322, drug data 1324, and/or prescription data 1326.

The plan sponsor data 1328 includes information regarding the plan sponsors of the PBM. Examples of the plan sponsor data 128 include company name, company address, contact name, contact telephone number, contact e-mail address, and the like.

Figure 14:
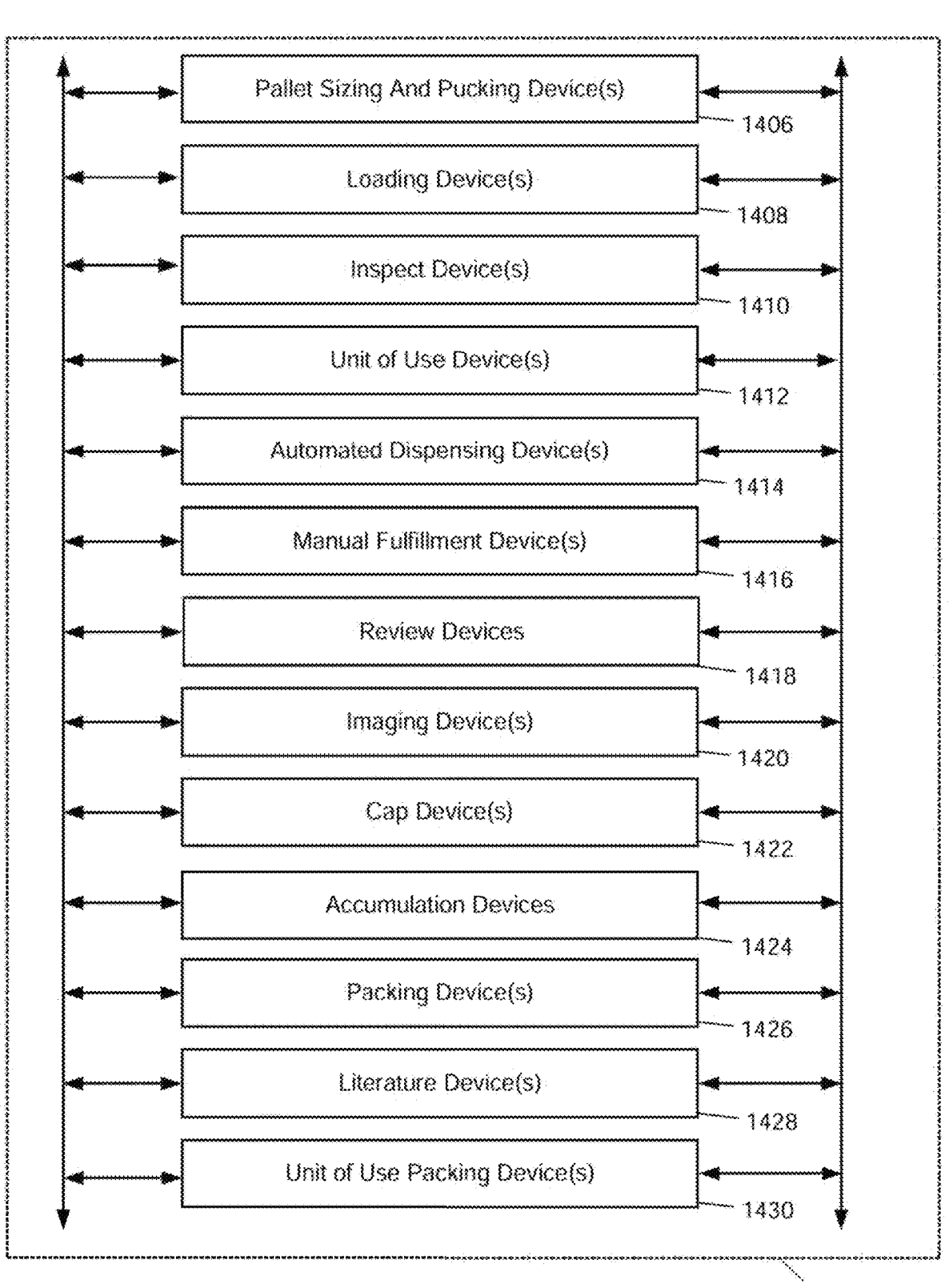
FIG. 14 is a block diagram of an example pharmacy fulfillment device that may be deployed within the system of FIG. 13.

FIG. 14 is a block diagram of an example pharmacy fulfillment device 1312 that may be deployed within the system of FIG. 13. The pharmacy fulfillment device 1312 may be used to process and fulfill prescriptions and prescription orders. After fulfillment, the fulfilled prescriptions are packed for shipping.

The pharmacy fulfillment device 1312 may include devices in communication with the benefit manager device, the order processing device 1314, and/or the non-transitory storage 1310, directly or over the network 1304. Specifically, the pharmacy fulfillment device 1312 may include pallet sizing and pucking device(s) 1406; loading device(s) 1408; inspect device(s) 1410, unit of use device(s) 1412, automated dispensing device(s) 1414, manual fulfillment device(s) 1416, review device(s) 1418, imaging device(s) 1420, cap device(s) 1422, accumulation device(s) 1424, literature device(s) 1428, packing device(s) 1426, and unit of use packing device(s) 1430. Further, the pharmacy fulfillment device 1312 may include additional devices, which may communicate with each other directly or over the network 1304.

In some embodiments, operations performed by one or more of these devices 1406-1430 may be performed sequentially, or in parallel with the operations of devices as may be coordinated by the order processing device 1314. In some embodiments, the order processing device 1314 tracks a prescription with the pharmacy based on operations performed by one or more than one of the devices 1406-1430.

In some embodiments, the pharmacy fulfillment device 1312 may transport prescription drug containers, for example, between more than one of the devices 1406-1430 in a high-volume fulfillment center, by use of pallets. The pallet sizing and pucking device 1406 may configure pucks in a pallet. A pallet may be a transport structure for a number of prescription containers, and may include a number of cavities. A puck may be placed in one or more than one of the cavities in a pallet by the pallet sizing and pucking device 1406. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 1314 based on prescriptions that the order processing device 1314 decides to launch. The arrangement logic may be implemented directly in the pallet sizing and pucking device 1406. Once a prescription is set to be launched, a puck suitable for the appropriate size of container for that prescription may be positioned in a pallet by a robotic arm or pickers. The pallet sizing and pucking device 1406 may launch a pallet once pucks have been configured in the pallet.

The loading device 1408 may load prescription containers into the pucks on a pallet by a robotic arm, a pick and place mechanism, or the like. In one embodiment, the loading device 1408 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high-volume fulfillment center or the like).

The inspect device 1410 may verify that containers in a pallet are correctly labeled and in the correct spot on the pallet. The inspect device 1410 may scan the label on one or more than one container on the pallet. Labels of containers may be scanned or imaged in full or in part by the inspect device 1410. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 1318.

The unit of use device 1412 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 1412 may be packaged individually or collectively for shipping, or may be shipped in combination with other prescription drugs dispensed by other devices (e.g., in the high volume fulfillment center).

At least some of the operations of the devices 1406-1430 may be directed by the other processing device 1314. For example, the manual fulfillment device 1416, the review device 1418, the automated dispensing device 1414, the packing device 1426, and/or another device may receive instructions provided by the order processing device.

The automated dispensing device 1414 may include one or more than one device that dispenses prescription drugs or pharmaceuticals into prescription containers in accordance with one or multiple prescription orders. In general, the automated dispensing device 1414 may include mechanical and electronic components with, in some embodiments, software and/or logic to facilitate pharmaceutical dispensing that would otherwise be performed in a manual fashion by a pharmacist and/or pharmacist technician. For example, the automated dispensing device 1414 may include high volume fillers (HVFs) that fill a number of prescription drug types at a rapid rate and blister pack machines that dispense and pack drugs into a blister pack. Prescription drugs dispensed by the automated dispensing devices 1414 may be packaged individually or collectively for shipping, or may be shipped in combination with other prescription drugs dispensed by other devices in the high volume fulfillment center.

The manual fulfillment device 1416 may provide for manual fulfillment of prescriptions. For example, the manual fulfillment device 1416 may receive or obtain a container and enable fulfillment of the container by a pharmacist or pharmacy technician. In some embodiments, the manual fulfillment device 1416 provides the filled container to another device in the pharmacy fulfillment devices 1312 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 1416 may be packaged individually or collectively for shipping or may be shipped in combination with other prescription drugs dispensed by other devices in the high-volume fulfillment center.

The review device 1418 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 1418 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 1420 may image containers prior to filling and/or after they have been filled with pharmaceuticals. The imaging device 1420 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 1314, and/or stored in the storage device 1310 as part of the order data 1318.

The cap device 1422 may be used to cap or otherwise seal a prescription container. In some embodiments, the cap device 1422 may secure a prescription container with a type of cap in accordance with a patient preference (e.g., a preference regarding child resistance, a preference regarding built-in adherence functionality, or the like), a plan sponsor preference, a prescriber preference, or the like. The cap device 1422 may also etch a message into the cap or otherwise associate a message into the cap, although this process may be performed by a different device in the high-volume fulfillment center.

The accumulation device 1424 accumulates various containers of prescription devices m a prescription order. The accumulation device 1424 may accumulate prescription containers from various devices or areas of the pharmacy. For example, the accumulation device 1424 may accumulate prescription containers from the unit of use device 1412, the automated dispensing device 1414, the manual fulfillment device 1416, and the review device 1418, at the high-volume fulfillment center. The accumulation device 1424 may be used to group the prescription containers prior to shipment to the member or otherwise.

The literature device 1428 prints, or otherwise generates, literature to include with prescription drug orders. The literature may be printed on multiple sheets of substrates, such as paper, coated paper, printable polymers, or combinations thereof. The literature printed by the literature device 1428 may include information required to accompany the prescription drugs included in a prescription order, relating to prescription drugs in the order, financial information associated with the order (e.g., an invoice or an account statement, or the like).

In some embodiments, the literature device 1428 folds or otherwise prepares the literature for inclusion with a prescription drug order (e.g., in a shipping container or the like). In some embodiments, the literature device 1428 that prints the literature may be separate from the literature device that prepares the literature for inclusion with a prescription order. The packing device 1426 packages a prescription order in preparation for shipping the order. The packing device 1426 may box, bag, or otherwise package the fulfilled prescription order for delivery. The packing device 1426 may be a wrap seal device. A wrap seal device deployed as the packing device 1426 may be a wrap seal device. A wrap seal device deployed as the packing device 1426 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 1426 may further place inserts (e.g., literature or other papers) into the packaging received from the literature device 1428 or otherwise. For example, bulk prescription orders may be shipped in a box, while other prescription orders may be shipped in a bag, which may be a wrap seal bag. The packing device 1426 may label the box or bag with an address and a recipient's name. The label may be printed and affixed to the bag or box, be printed directly onto the bag or box, or otherwise associated with the bag or box. The packing device 1426 may sort the box or bag for mailing in an efficient manner (e.g., sort by delivery address, sort by zip code, or the like). The packing device 1426 may label the box or bag with an address and a recipient's name. The label may be printed and affixed to the bag or box, be printed directly onto the bag or box, or otherwise associated with the bag or box. The packing device 1426 may sort the box or bag for mailing in an efficient manner (e.g., sort by delivery address, sort by zip code, or the like). The packing device 1426 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

The unit of use packing device 1430 packages a unit of use prescription order in preparation for shipping the order.

The pharmacy fulfillment device 1312 in FIG. 2 may include single devices 1406-1430 or multiple devices 1406-1430 (e.g., depending upon implementation in a pharmacy). The devices 1406-1430 may be the same type or model of device or may be different device types or models. When multiple devices are present, the multiple devices may be of the same device type or models or may be a different device type or model. The types of devices 1406-1430 shown in FIG. 14 are example devices. In other configurations of the system 1300, lesser, additional, or different types of devices may be included.

Moreover, multiple devices may share processing and/or memory resources. The devices 1406-1430 may be located in the same area or in different locations. For example, the devices 1406-1430 may be located in a building or a set of adjoining buildings. The devices 1406-1430 may be interconnected (e.g., by conveyors), networked, and/or otherwise in contact with one another or integrated with one another (e.g., at the high-volume fulfillment center). In addition, the functionality of a device may be split among a number of discrete devices and/or combined with other devices.

Figure 15:
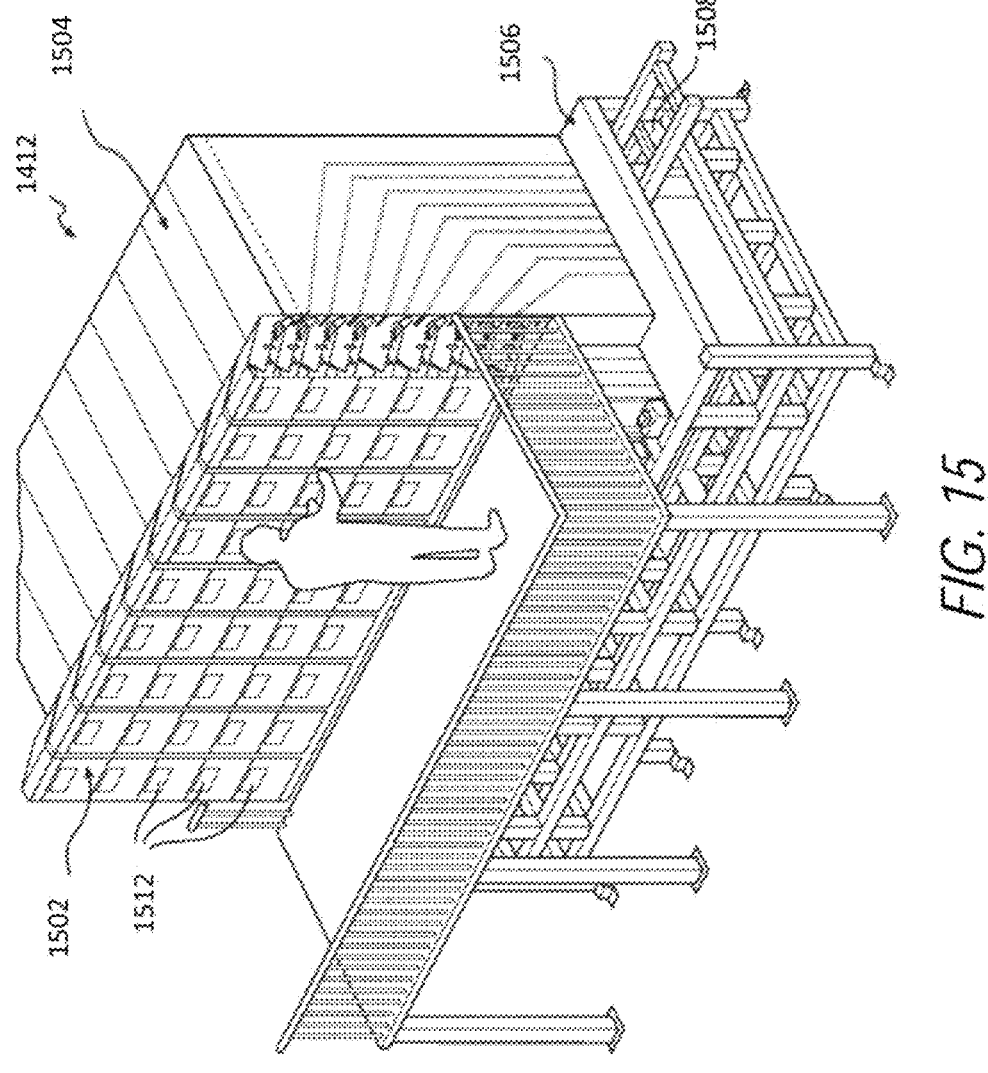
FIG. 15 is a perspective elevation view of a unit of use device that may be deployed within the system of FIG. 13.

FIG. 15 is a perspective elevation view of a unit of use device that may be deployed within the system of FIG. 13. As shown in FIG. 15, the unit of use device may be implemented as an automated dispensing device 1412, according to an example embodiment. The automated dispensing device 1412 enables dispensing of a number of different types of pharmaceuticals in an automated or semi-automatic manner. The automated dispensing device 1412 includes a filling cabinet 1502, a prefill assembly 1504, and a pallet system 1506, which includes a pallet conveyor 1508. The filling cabinet 1502 stores pharmaceuticals to be dispensed into containers via the prefill assembly 1504 and dispenses measured quantities of pharmaceuticals into the prefill assembly 1504. The prefill assembly 1504 stores measured quantities of medications and dispenses the measured quantities of medications received from the filling cabinet 1502 into containers on ae pallet while the pallet is positioned in a pallet system 1506. The pallet conveyor 1508 can transport the pallets through some or all of the devices within the pharmacy fulfillment device 1312 (shown in FIG. 13).

As discussed in further detail below, in operation, the pallet conveyor 1508 automatically brings a pallet with one or more containers to the pallet system 1506. The pallet system 1506 automatically guides the pallet to a location directly beneath the prefill assembly 1504 so that the measured quantity of medications can be dispensed into one of the containers found on the pallet. This process can be repeated to dispense multiple measured quantities of the same or different medications into different containers on the pallet. The pallet conveyor 1508 may be a chain conveyor or a belt driven conveyor, e.g., a belted Bosch TS2 belt-driven conveyor. In some embodiments, the pallet conveyor 1508 is a low friction, high-speed conveyor. Although pallets are generally described herein as employed to move a group of containers through the system 1300 or within the automated dispensing device 1412, trays or other types of carriers and any suitable type of container management system may be employed to individually or as a group move the containers through the system 1300 or within the automated dispensing device 1412.

In the exemplary embodiment, the filling cabinet 1502 is physically adjacent to the prefill assembly 1504, and the prefill assembly 1504 is physically located directly above the pallet system 1506. For example, the filling cabinet 1502 and prefill assembly 1504 may be located on a second floor (e.g., in a building), and the pallet system 1506 may be located on a second floor below the first. These components of the automated dispensing device 1412 may be otherwise positioned, e.g., in a position to utilize gravity to move medications from the filling cabinet 1502 to the prefill assembly 1504 and then to the containers on the pallet. For example, some portion of the filling cabinet 1502 may extend below the first floor.

In the exemplary embodiment, the filling cabinet 1502 includes multiple cells 1512 arranged in a grid-like pattern with a plurality of columns and a plurality of rows. Specifically, in the exemplary embodiment, the filling cabinet 1502 has ten columns and nine rows for a total of ninety cells 1512. In some embodiments, the filling cabinet 1502 has either more or fewer rows and/or columns of cells 1512. The various cells 1512 may each be adapted to similar or different solid medications, e.g., pills, tablets, or capsules. For example, in some embodiments, a commonly prescribed medication may occupy more than one cell 1512. The cells 1512 are be adapted to receive inserts 1514, which can hold the medications then automatically dispense the medications into the prefill assembly 1504. In the exemplary embodiment, at least some inserts 1516 may be permanently located in the cells 1512 (other cells may include inserts that can pull out like drawers). In the exemplary embodiment, only a single filling cabinet 1502 with a single prefill assembly 1504 is shown. However, in some embodiments, two opposing filing cabinets 1502 and two opposing prefill assemblies 1504 may be positioned over the same pallet system 1504.

As shown, each cell 1512 has a pill counter with an output, which feeds the pharmaceuticals contained therein into the prefill assembly 1504. The prefill assembly 1504 includes a plurality of doors, each of which includes a guiding system for guiding the pharmaceuticals dispensed from the respective cells 1512 into the appropriate containers on the pallet in the pallet system 1506. The doors can be slid horizontally away from the filling cabinet 1502 for maintenance either while the automated dispensing device 1412 is in operation or shut down. The filling cabinet 1502 is configured such that the cell 1512 will not dispense medications when the door aligned that cell 1512 is out of position, such as during maintenance.

In the exemplary embodiment, each cell 1512 has a face plate with a door which must be unlocked to open so that the insert can be filled with medications or so the insert can be replaced with another insert. The door is configured to only unlock pursuant to a medication verification process that both mitigates risk of access to the medications to unauthorized individuals and that mitigates the risks that improper and/or defective medications will be added to the insert. The lock on the door can be of any suitable type which can be remotely and electronically locked and unlocked, for example, with an electronically activated solenoid.

The medication verification process utilizes at least one technician and a pharmacist. The technician is physically located at the automated dispensing device 1412 with the filling cabinet 1502 for physically refilling the cells 1512 with the medications, and the pharmacist may either be located at the automated dispensing device 1412 or who may be remote therefrom. In some embodiments, the automated filling device 1412 includes a plurality of filling cabinets 1502 and a plurality of technicians with each technician being individually responsible for one or more filling cabinets 1502. In other embodiments, more than one technician may be responsible for the same filling cabinet 1502. As discussed in further detail below, during the medication verification process, a number of checks must be passed before any medications can be added to a cell 1512, and to overcome those checks, the technician and pharmacist work as a team while utilizing automatic technological tools to ensure that the cells 1512 are only filled with the correct medications.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

Embodiments of the present disclosure are directed toward the use of two or more UAVS, e.g., flying autonomous vehicles, working in cooperation, to deliver an item between a source location (e.g., a pharmacy) and a destination location (e.g., a patient location, a care facility, a patient residence or the like). A first type of UAV having greater carrying ability than a second type of UAV. The first type of UAV can carry multiple items a farther distance than the second type of UAV. The second UAV being capable of delivering a single item or a subset of items delivered to a regional hub by the first type of UAV. As both the types of UAVs fly, they can both avoid ground based obstacles along a delivery path. Moreover, UAVs can fly a straight line path to a transfer, regional hub and to the final delivery location. The first type of delivery UAV can avoid ground-based traffic congestion, e.g., due to a high traffic volume, ground vehicle accident, road construction and the like, road blockages due to weather, e.g., downed trees or power lines, flooding or the like. The second type of UAV can also avoid the same traffic congestion issues as the first type of UAV as well as avoiding local obstacles to delivery, e.g., a fence, unfriendly animals, elevated delivery location and the like.

An example embodiment of the present disclosure is directed to a non-transitory computer readable medium comprising non-transitory computer-readable instructions for performing operations comprising: obtaining, by a distance unmanned aerial vehicle (UAV), a package that includes a plurality of items, each item being associated with a target delivery destination; delivering, by the distance UAV, the package to a regional hub that includes a local UAV, the distance UAV being configured to travel a longer distance and carry more weight than the local UAV; retrieving, by the local UAV, a given item of the plurality of items from the package; determining, by the local UAV, the target delivery destination associated with the given item; and delivering, by the local UAV, the given item to the target delivery destination.

Another example embodiment of the present disclosure is direct to the operations further comprise determining, by the local UAV, based on item information of the given item (e.g., a prescription package) whether a sufficient amount of resources of the local UAV are available for delivering the given item from the regional hub to the target delivery destination. In an example embodiment, the predictive models are used to determine if a local UAV or local UAV type can deliver a particular package or type of package.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:
1. A drug delivery system, comprising:
a distance unmanned aerial vehicle (UAV) configured to:
    perform point-to-point travel to a regional hub; and
    transport, to the regional hub, a distance payload including a plurality of regional payloads associated with a plurality of target delivery destinations;
    transmit an arrival signal to the distance payload indicating that the distance payload has arrived at the regional hub, the distance payload configured to automatically open in response to the arrival signal from the distance UAV and transmit a beacon signal in response to automatically opening;

a plurality of local unmanned aerial vehicles (UAVs) configured to:

reside at the regional hub comprising a base station for the plurality of local UAVs, wherein the regional hub includes a flight departing location and a flight returning location for deliveries performed by the plurality of local UAVs;

receive the beacon signal instructing each of the plurality of local UAVs to begin picking up the plurality of regional payloads;

obtain, at the regional hub, the plurality of regional payloads for the deliveries to the plurality of target delivery destinations in response to the beacon;

perform lateral movement and hover operations to perform the deliveries; and a server including one or more processors and a memory component, the one or more processors configured to:

determine a target delivery destination for one prescription drug item, wherein the plurality of target delivery destinations includes the target delivery destination;

determine estimated travel duration and delivery path parameters to be traveled by the distance UAV and the local UAV;

identify perishable aspects of the one prescription drug item;

calculate a temperature modeling equation factoring in at least the estimated travel duration, the delivery path parameters, and the perishable aspects of the one prescription drug item;

select packaging materials and cooling materials for a regional payload consisting of the one prescription drug item based on the temperature modeling equation to avoid spoilage of the one prescription drug item;

transmit first instructions to the distance UAV instructing the distance UAV to fly to the regional hub with the distance payload including a regional payload consisting of the one prescription drug item, wherein the plurality of regional payloads includes the regional payload; and transmit second instructions to a local UAV of the plurality of local UAVs, to:

obtain the regional payload consisting of the one prescription drug item;

transport the regional payload from the regional hub to the target delivery destination;

perform the lateral movement and the hover operations to access a delivery site of the target delivery destination; and deliver the one prescription drug item by releasing the regional payload at the delivery site of the target delivery destination.

2. The drug delivery system of claim 1, wherein the plurality of local UAVs further comprises a plurality of machine-readable code readers; and wherein the plurality of local UAVs is further configured to:

scan machine-readable code for the plurality of regional payloads, using the plurality of machine-readable code readers;

obtain data parameters associated with the plurality of regional payloads, based on scanning the machine-readable code; and perform the deliveries based on the data parameters.

3. The drug delivery system of claim 2, wherein the data parameters include at least the plurality of target delivery destinations including the target delivery destination for the regional payload; and wherein the local UAV is further configured to transport the regional payload to the target delivery destination based on scanning the machine-readable code.

4. The drug delivery system of claim 2, wherein the data parameters include at least a plurality of weights associated with the plurality of regional payloads, wherein the plurality of weights includes a weight associated with the regional payload; and wherein the server is further configured to:

compute an estimated amount of flight resources needed to deliver the one prescription drug item to the target delivery destination, based on the weight associated with the regional payload;

determine whether the local UAV includes sufficient resources to:

transport the regional payload from the regional hub to the target delivery destination; and perform a return flight to the regional hub; and based on the local UAV including the sufficient resources, transmit the second instructions to the local UAV.

5. The drug delivery system of claim 2, wherein the data parameters include at least a plurality of weights associated with the plurality of regional payloads, wherein the plurality of weights includes a weight associated with the regional payload; and wherein the local UAV is further configured to:

compute an estimated amount of flight resources needed to deliver the one prescription drug item to the target delivery destination, based on the weight associated with the regional payload;

determine whether the local UAV includes sufficient resources to:

transport the regional payload from the regional hub to the target delivery destination; and perform a return flight to the regional hub; and based on the local UAV including the sufficient resources, transport the regional payload from the regional hub to the target delivery destination and performing the return flight.

6. The drug delivery system of claim 1, wherein the distance UAV further comprises an internal combustion engine; and wherein the distance UAV is further configured to perform the point-to-point travel in a forward motion using the internal combustion engine.

7. The drug delivery system of claim 6, wherein the distance UAV comprises a fixed-wing aircraft incapable of hover.

8. The drug delivery system of claim 1, wherein the plurality of local UAVs further comprise horizontal rotors; and wherein the plurality of local UAVs are further configured to perform the lateral movement and the hover operations using the horizontal rotors.

9. The drug delivery system of claim 1, wherein the delivery site includes at least one of: a balcony, a porch, a garage, a backyard site, and a specialized receptacle.

10. A method for delivering prescription medications, the method comprising:

determining a target delivery destination for a regional payload consisting of one prescription drug item, by a server communicatively coupled to: (i) a distance unmanned aerial vehicle (UAV) configured to perform point-to-point travel to a regional hub, and (ii) a plurality of local unmanned aerial vehicles (UAVs) configured to reside at the regional hub and to perform deliveries using lateral movement and hover operations;

determining estimated travel duration and delivery path parameters to be traveled by the distance UAV and the local UAV;

identifying perishable aspects of the one prescription drug item;

calculating a temperature modeling equation factoring in at least the estimated travel duration, the delivery path parameters, and the perishable aspects of the one prescription drug item;

selecting packaging materials and cooling materials for the regional payload consisting of the one prescription drug item based on the temperature modeling equation to avoid spoilage of the one prescription drug item;

transmitting, by the server via a communication device, first instructions to the distance UAV instructing the distance UAV to fly to the regional hub with a distance payload including a plurality of regional payloads associated with a plurality of target delivery destinations, wherein the plurality of regional payloads includes the regional payload consisting of the one prescription drug item, and wherein the plurality of target delivery destinations includes the target delivery destination;

transmitting, by the distance UAV, an arrival signal to the distance payload indicating the distance payload has arrived at the regional hub;

the distance payload automatically opening in response to the arrival signal from the distance UAV;

transmitting, by the distance payload, a beacon signal in response to the distance payload automatically opening; and transmitting, by the server via the communication device, second instructions to a local UAV of the plurality of local UAVs, to:

obtain the regional payload consisting of the one prescription drug item in response to receiving the beacon signal instructing each of the plurality of local UAVs to begin picking up the plurality of regional payloads;

transport the regional payload from the regional hub to the target delivery destination;

perform the lateral movement and the hover operations to access a delivery site of the target delivery destination; and deliver the one prescription drug item by releasing the regional payload at the delivery site of the target delivery destination.

11. The method of claim 10, further comprising:

developing at least one UAV model representing performance of local UAV types at the regional hub, by the server, based on historical data associated with the regional hub, the local UAVs, and historical delivery performance associated with the one prescription drug item and the local UAV types; and when the at least one UAV model indicates that the one prescription drug item can be delivered to the target delivery destination, transmitting the second instructions to the local UAV, by the server via the communication device.

12. The method of claim 11, further comprising:

using the at least one UAV model to determine whether one of the plurality of local UAVs is capable of transporting the one prescription drug item to the target delivery destination, by the server, based on at least one of: a distance capability, a temperature tolerance, an environmental condition tolerance, and a weight tolerance; and when the one of the plurality of local UAVs is capable, determining that the one prescription drug item can be delivered.

13. The method of claim 11, further comprising:

using the at least one UAV model to determine whether the one prescription drug item is capable of being delivered to the target delivery destination, by the server, based on at least one of: a temperature tolerance of the one prescription drug item, environmental condition tolerance of the one prescription drug item, and available packaging options and associated temperature tolerances and environmental condition tolerances; and when the one prescription drug item is capable, determining that the one prescription drug item can be delivered.

14. The method of claim 10, further comprising:

scanning machine-readable code for the plurality of regional payloads, by the plurality of local UAVs using a plurality of machine-readable code readers;

obtaining data parameters associated with the plurality of regional payloads, by the plurality of local UAVs, based on scanning the machine-readable code; and performing the deliveries based on the data parameters, by the plurality of local UAVs.

15. The method of claim 14, further comprising:

transporting the regional payload to the target delivery destination based on scanning the machine-readable code, wherein the data parameters include at least the plurality of target delivery destinations including the target delivery destination for the regional payload.

16. The method of claim 14, further comprising:

computing an estimated amount of flight resources needed to deliver the one prescription drug item to the target delivery destination, by the server, based on a weight associated with the regional payload, wherein the data parameters include at least a plurality of weights associated with the plurality of regional payloads, wherein the plurality of weights includes the weight associated with the regional payload;

determining, by the server, whether the local UAV includes sufficient resources to:

transport the regional payload from the regional hub to the target delivery destination; and perform a return flight to the regional hub; and based on the local UAV including the sufficient resources, transmitting the second instructions to the local UAV, by the server.

17. The method of claim 14, further comprising:

computing an estimated amount of flight resources needed to deliver the one prescription drug item to the target delivery destination, by the local UAV, based on a weight associated with the regional payload, wherein the data parameters include at least a plurality of weights associated with the plurality of regional payloads, wherein the plurality of weights includes the weight associated with the regional payload;

determining whether the local UAV includes sufficient resources to:

transport the regional payload from the regional hub to the target delivery destination; and perform a return flight to the regional hub; and based on the local UAV including the sufficient resources, transporting the regional payload from the regional hub to the target delivery destination and performing the return flight, by the local UAV.

* * * * *